United States Patent
Carpenter et al.

(10) Patent No.: US 10,627,794 B2
(45) Date of Patent: Apr. 21, 2020

(54) CONTROLLING IOT DEVICES VIA PUBLIC SAFETY ANSWERING POINT

(71) Applicant: CenturyLink Intellectual Property LLC, Broomfield, CO (US)

(72) Inventors: Philip W. Carpenter, Castle Rock, CO (US); James D. Scheller, Windsor, CO (US); Paul Johnson, Littleton, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 11 days.

(21) Appl. No.: 16/113,130

(22) Filed: Aug. 27, 2018

(65) Prior Publication Data

US 2019/0187643 A1 Jun. 20, 2019

Related U.S. Application Data

(60) Provisional application No. 62/607,787, filed on Dec. 19, 2017.

(51) Int. Cl.
*G05B 19/042* (2006.01)
*H04W 4/90* (2018.01)
(Continued)

(52) U.S. Cl.
CPC ............ *G05B 19/042* (2013.01); *H04L 67/12* (2013.01); *H04L 67/125* (2013.01); *H04M 3/00* (2013.01);
(Continued)

(58) Field of Classification Search
None
See application file for complete search history.

(56) References Cited

U.S. PATENT DOCUMENTS

| 5,717,955 A | 2/1998 | Swinehart |
| 6,388,399 B1 | 5/2002 | Eckel |

(Continued)

FOREIGN PATENT DOCUMENTS

| CN | 101799987 B | 11/2011 |
| KR | 10-2015-0128346 | 11/2015 |

(Continued)

OTHER PUBLICATIONS

International Preliminary Report on Patentability, dated Jul. 17, 2018, 8 pages.

(Continued)

*Primary Examiner* — Ramesh B Patel

(57) ABSTRACT

Novel tools and techniques are provided for implementing Internet of Things ("IoT") functionality with a Public Safety Answering Point ("PSAP"). In some embodiments, a computing system located at a PSAP might receive a first message indicative of an emergency situation, analyze the first message to determine one or more actions to be taken, and identify one or more devices (e.g., household devices; vehicular components associated with a vehicle; utility devices; devices disposed in, on, or along a roadway; devices disposed throughout a population area; etc.) for performing the determined one or more first actions. The computing system might then autonomously control each of the identified one or more devices to perform tasks based on the determined one or more first actions to be taken, thereby implementing smart environment functionality (e.g., smart home, building, or customer premises functionality, smart vehicle functionality, smart utility, smart roadway functionality, smart city functionality, etc.).

20 Claims, 11 Drawing Sheets

(51) Int. Cl.
  *H04L 29/08* (2006.01)
  *H04W 4/70* (2018.01)
  *H04W 4/38* (2018.01)
  *H04W 4/33* (2018.01)
  *H04M 3/00* (2006.01)
  *H04W 84/18* (2009.01)
  *H04W 4/80* (2018.01)
  *H04W 4/02* (2018.01)
  *H04W 4/40* (2018.01)

(52) U.S. Cl.
  CPC .............. *H04W 4/33* (2018.02); *H04W 4/38* (2018.02); *H04W 4/70* (2018.02); *H04W 4/90* (2018.02); *G05B 2219/2613* (2013.01); *H04W 4/023* (2013.01); *H04W 4/027* (2013.01); *H04W 4/40* (2018.02); *H04W 4/80* (2018.02); *H04W 84/18* (2013.01)

(56) References Cited

U.S. PATENT DOCUMENTS

| | | |
|---|---|---|
| 6,792,319 B1 | 9/2004 | Bilger |
| 7,030,781 B2 * | 4/2006 | Jones .................... G08G 1/123 340/989 |
| 7,096,003 B2 | 8/2006 | Joao |
| 7,397,363 B2 | 7/2008 | Joao |
| 7,739,030 B2 | 6/2010 | Desai |
| 8,296,383 B2 | 10/2012 | Lindahl |
| 8,380,652 B1 | 2/2013 | Francis, Jr. |
| 8,654,936 B1 | 2/2014 | Eslambolchi et al. |
| 9,298,410 B2 | 3/2016 | Juchem |
| 9,432,340 B1 | 8/2016 | Tutt et al. |
| 9,456,276 B1 | 9/2016 | Chhetri |
| 9,460,618 B1 | 10/2016 | Soltesz |
| 9,536,425 B1 | 1/2017 | Soltesz |
| 9,646,480 B2 | 5/2017 | Fadell |
| 9,669,872 B2 | 6/2017 | Rebhan |
| 9,672,734 B1 | 6/2017 | Ratnasingam |
| 9,761,136 B2 | 9/2017 | Tonguz |
| 9,905,122 B2 | 2/2018 | Sloo |
| 9,917,903 B2 | 3/2018 | Clernon |
| 10,150,471 B2 * | 12/2018 | Funk .................... H04W 4/70 |
| 10,253,468 B1 | 4/2019 | Linville |
| 2001/0029311 A1 | 10/2001 | Khare |
| 2002/0024450 A1 | 2/2002 | Townsend |
| 2003/0061029 A1 | 3/2003 | Shaket |
| 2004/0083054 A1 * | 4/2004 | Jones .................... G08G 1/123 701/465 |
| 2004/0091313 A1 | 5/2004 | Zhou |
| 2004/0113773 A1 | 6/2004 | Nieters |
| 2004/0160319 A1 * | 8/2004 | Joao .................... B60R 25/018 340/539.1 |
| 2005/0248444 A1 | 11/2005 | Joao |
| 2006/0150644 A1 | 7/2006 | Wruck |
| 2006/0219382 A1 | 10/2006 | Johnson |
| 2007/0048084 A1 | 3/2007 | Jung |
| 2007/0079113 A1 | 4/2007 | Kulkarni et al. |
| 2008/0197204 A1 | 8/2008 | Whitney |
| 2008/0216367 A1 | 9/2008 | Van der Poel |
| 2008/0234878 A1 * | 9/2008 | Joao .................... B60R 25/102 701/2 |
| 2008/0256008 A1 | 10/2008 | Kwok |
| 2008/0300776 A1 | 12/2008 | Petrisor |
| 2008/0303654 A1 * | 12/2008 | Kates .................... G08B 13/04 340/539.3 |
| 2009/0121860 A1 | 5/2009 | Kimmel |
| 2009/0125160 A1 | 5/2009 | Desai |
| 2009/0134993 A1 | 5/2009 | Ashworth |
| 2009/0327910 A1 | 12/2009 | Black |
| 2010/0045484 A1 | 2/2010 | Brynielsson |
| 2010/0124332 A1 | 5/2010 | Arena |
| 2010/0217604 A1 | 8/2010 | Baldwin et al. |
| 2010/0325421 A1 | 12/2010 | Park et al. |
| 2011/0106321 A1 * | 5/2011 | Cherian .................... H02J 3/00 700/286 |
| 2011/0288684 A1 | 11/2011 | Farlow |
| 2012/0086563 A1 | 4/2012 | Arling |
| 2012/0249341 A1 | 10/2012 | Brown |
| 2012/0265370 A1 | 10/2012 | Kim |
| 2012/0315921 A1 * | 12/2012 | Stone .................... H04L 67/18 455/456.1 |
| 2013/0009569 A1 | 1/2013 | Knibbe |
| 2013/0038461 A1 | 2/2013 | Hawkes |
| 2013/0217421 A1 | 8/2013 | Kim |
| 2013/0238326 A1 | 9/2013 | Kim et al. |
| 2013/0297199 A1 | 11/2013 | Kapp |
| 2013/0311917 A1 * | 11/2013 | Bar-or .................... G06Q 50/22 714/764 |
| 2014/0018969 A1 * | 1/2014 | Forbes, Jr. .......... H02J 13/0013 700/295 |
| 2014/0167931 A1 | 6/2014 | Lee et al. |
| 2014/0180478 A1 | 6/2014 | Letsky |
| 2014/0188463 A1 | 7/2014 | Noh et al. |
| 2014/0257693 A1 | 9/2014 | Ehlers |
| 2014/0343950 A1 | 11/2014 | Simpson et al. |
| 2015/0097686 A1 | 4/2015 | Fadell |
| 2015/0100167 A1 | 4/2015 | Sloo |
| 2015/0187200 A1 | 7/2015 | Fadell |
| 2015/0249672 A1 | 9/2015 | Burns et al. |
| 2015/0262102 A1 | 9/2015 | Tann |
| 2015/0298654 A1 | 10/2015 | Joao |
| 2015/0350247 A1 | 12/2015 | Adler et al. |
| 2015/0365278 A1 | 12/2015 | Chakrabarti et al. |
| 2016/0021127 A1 | 1/2016 | Yan |
| 2016/0029346 A1 | 1/2016 | Suresh et al. |
| 2016/0063857 A1 | 3/2016 | Fowe |
| 2016/0093213 A1 | 3/2016 | Rider |
| 2016/0187995 A1 | 6/2016 | Rosewall |
| 2016/0195876 A1 * | 7/2016 | Mattsson .................... A01G 25/16 701/25 |
| 2016/0212613 A1 | 7/2016 | Huang |
| 2016/0226674 A1 | 8/2016 | Kangshang et al. |
| 2016/0248746 A1 | 8/2016 | James |
| 2016/0267790 A1 | 9/2016 | Raamot |
| 2016/0278599 A1 | 9/2016 | Seo |
| 2016/0294828 A1 | 10/2016 | Zakaria |
| 2016/0295364 A1 | 10/2016 | Zakaria |
| 2016/0329040 A1 | 11/2016 | Whinnery |
| 2016/0330042 A1 | 11/2016 | Andersen |
| 2016/0352526 A1 | 12/2016 | Adler et al. |
| 2016/0359965 A1 | 12/2016 | Murphy et al. |
| 2017/0006141 A1 | 1/2017 | Bhadra |
| 2017/0006643 A1 | 1/2017 | Zakaria et al. |
| 2017/0026157 A1 | 1/2017 | Bugenhagen et al. |
| 2017/0026472 A1 | 1/2017 | Bugenhagen et al. |
| 2017/0060369 A1 | 3/2017 | Goyal |
| 2017/0083005 A1 | 3/2017 | Hickman |
| 2017/0093866 A1 | 3/2017 | Ben-Noon |
| 2017/0110784 A1 | 4/2017 | Vermes et al. |
| 2017/0134937 A1 | 5/2017 | Miller |
| 2017/0141575 A1 | 5/2017 | Fulton |
| 2017/0171747 A1 | 6/2017 | Britt et al. |
| 2017/0176034 A1 | 6/2017 | Hussain |
| 2017/0181383 A1 | 6/2017 | Shen |
| 2017/0187807 A1 | 6/2017 | Clernon |
| 2017/0192437 A1 * | 7/2017 | Bier .................... G05D 1/0287 |
| 2017/0195318 A1 | 7/2017 | Liu |
| 2017/0201504 A1 | 7/2017 | Funk |
| 2017/0206900 A1 | 7/2017 | Lee et al. |
| 2017/0238129 A1 * | 8/2017 | Maier .................... H04W 4/14 455/404.2 |
| 2017/0253258 A1 | 9/2017 | Bramucci |
| 2017/0274898 A1 | 9/2017 | Nakamura |
| 2017/0279620 A1 | 9/2017 | Kravitz et al. |
| 2017/0300953 A1 | 10/2017 | Kim |
| 2017/0345295 A1 | 11/2017 | Mattar |
| 2017/0345420 A1 | 11/2017 | Barnett, Jr. |
| 2017/0358025 A1 * | 12/2017 | Varma .................... G06Q 30/08 |
| 2017/0371337 A1 | 12/2017 | Ramasamy |
| 2018/0040172 A1 | 2/2018 | Funk |
| 2018/0062691 A1 | 3/2018 | Barnett, Jr. |
| 2018/0084596 A1 | 3/2018 | Schwengler et al. |
| 2018/0103579 A1 | 4/2018 | Grufman |
| 2018/0113450 A1 | 4/2018 | Sherony |

(56) References Cited

U.S. PATENT DOCUMENTS

| | | | |
|---|---|---|---|
| 2018/0122506 A1 | 5/2018 | Grantcharov |
| 2018/0168464 A1 | 6/2018 | Barnett, Jr. et al. |
| 2018/0174449 A1 | 6/2018 | Nguyen |
| 2018/0178781 A1 | 6/2018 | Funk et al. |
| 2018/0181091 A1 | 6/2018 | Funk et al. |
| 2018/0181094 A1 | 6/2018 | Funk et al. |
| 2018/0181095 A1 | 6/2018 | Funk et al. |
| 2018/0183685 A1 | 6/2018 | Cook |
| 2018/0183874 A1 | 6/2018 | Cook |
| 2018/0299290 A1 | 10/2018 | Slavin |
| 2018/0370567 A1 | 12/2018 | Rowell |
| 2018/0374347 A1 | 12/2018 | Silver |
| 2019/0035269 A1 | 1/2019 | Donovan |
| 2019/0049994 A1 | 2/2019 | Pohl |
| 2019/0073899 A1 | 3/2019 | Radomy |
| 2019/0106099 A1 | 4/2019 | Funk |

FOREIGN PATENT DOCUMENTS

| | | | |
|---|---|---|---|
| WO | WO-2009-098676 | 8/2009 |
| WO | WO-2013-058648 | 4/2013 |
| WO | WO-2017-123392 | 7/2017 |

OTHER PUBLICATIONS

International Search Report and Written Opinion prepared by the Korean Intellectual Property Office as International Searching Authority for PCT Intl Patent App. No. PCT/US2016/067938 dated Mar. 31, 2017; 11 pages.

International Search Report and Written Opinion prepared by the Korean Intellectual Property Office as International Searching Authority for PCT International Patent Application No. PCT/US2017/034531 dated Aug. 29, 2017; 18 pages.

Alexander, Chris, et al., Improved User Authentication in Off-The-Record Messaging, Pub. 2009, 7 pages.

Bersch, Christian, et al., Bimanual Robotic Cloth Manipulation for Laundry Folding, Pub. 2011, 7 pages.

Borisov, Nikita, et al., Off-the-Record Communication, or, Why Not to Use PGP, Pub. 2004, 8 pages.

Di Raimondo, Mario, et al., Secure Off-the-Record Messaging, Pub. 2005, 9 pages.

Goldberg, Ian, et al., Multi-party Off-the-Record Messaging, Pub. 2007, 11 pages.

* cited by examiner

CONTROLLING IOT DEVICES VIA PUBLIC SAFETY ANSWERING POINT

CROSS-REFERENCES TO RELATED APPLICATIONS

This application claims priority to U.S. Patent Application Ser. No. 62/607,787 (the "'787 Application"), filed on Dec. 19, 2017 by Phil Carpenter, entitled, "Public Safety Access Point (PSAP) Remote Automation of Utilities," the disclosure of which is incorporated herein by reference in its entirety for all purposes.

This application may be related to U.S. patent application Ser. No. 15/370,764 (the "'764 application"), filed Dec. 6, 2016 by Thomas C. Barnett, Jr., et al. and titled, "Internet of Things (IoT) Human Interface Apparatus, System, and Method", which claims priority to U.S. Patent Application Ser. No. 62/342,710 (the "'710 application"), filed May 27, 2016 by Thomas C. Barnett, Jr., et al. and titled, "Internet of Things (IoT) Human Interface Apparatus, System, and Method".

This application may also be related to each of U.S. patent application Ser. No. 15/389,962 (the "'962 Application"), filed on Dec. 23, 2016 by Tom Funk et al. and titled, "Smart Home, Building, or Customer Premises Apparatus, System, and Method", U.S. patent application Ser. No. 15/389,983 (the "'983 Application"), filed on Dec. 23, 2016 by Tom Funk et al. and titled, "Smart Vehicle Apparatus, System, and Method", U.S. patent application Ser. No. 15/390,023 (the "'023 Application"), filed on Dec. 23, 2016 by Tom Funk et al. and titled, "Smart Roadway Apparatus, System, and Method", and U.S. patent application Ser. No. 15/390,061 (the "'061 Application"), filed on Dec. 23, 2016 by Tom Funk et al. and titled, "Smart City Apparatus, System, and Method".

This application may also be related to each of U.S. patent application Ser. No. 15/385,667 (the "667 Application"), filed on Dec. 20, 2016 by Tom Barnett et al. and titled, "Internet of Thinks (IoT) Personal Tracking Apparatus, System, and Method" and U.S. patent application Ser. No. 15/389,753 (the "'753 Application"), filed on Dec. 23, 2016 by Charles Cook et al. and titled, "Internet of Thinks (IOT) Self-Organizing Network".

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing Internet of Things functionality with a Public Safety Answering Point ("PSAP"), and, in particular embodiments, to methods, systems, apparatus, and computer software for implementing smart environment functionality with a PSAP, which includes, without limitation, smart home, building, or customer premises functionality, smart vehicle functionality, smart utility functionality, smart roadway functionality, smart city functionality, and/or the like.

BACKGROUND

Although Internet of Things ("IoT") is currently being implemented in some commercial settings, such conventional IoT deployments do not appear to fully utilize the full interconnectedness with a Public Safety Answering Point ("PSAP") and IoT-capable sensors. In addition, conventional PSAPs do not appear to analyze a message indicative of an emergency and/or sensor data indicative of an emergency to determine one or more actions to be taken in response to the emergency situation and identify one or more devices (be they household devices, vehicular components, utility devices, devices disposed in, on, or along a roadway, and/or devices disposed throughout a population area, etc.) for performing the determined one or more actions. Such conventional IoT deployments/PSAP deployments also do not appear to autonomously control each of the identified one or more devices to perform tasks based on the determined actions to be taken.

Hence, there is a need for more robust and scalable solutions for implementing Internet of Things functionality with a Public Safety Answering Point ("PSAP"), and, in particular embodiments, to methods, systems, apparatus, and computer software for implementing smart environment functionality with a PSAP, which includes, without limitation, smart home, building, or customer premises functionality, smart vehicle functionality, smart utility functionality, smart roadway functionality, smart city functionality, and/or the like.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
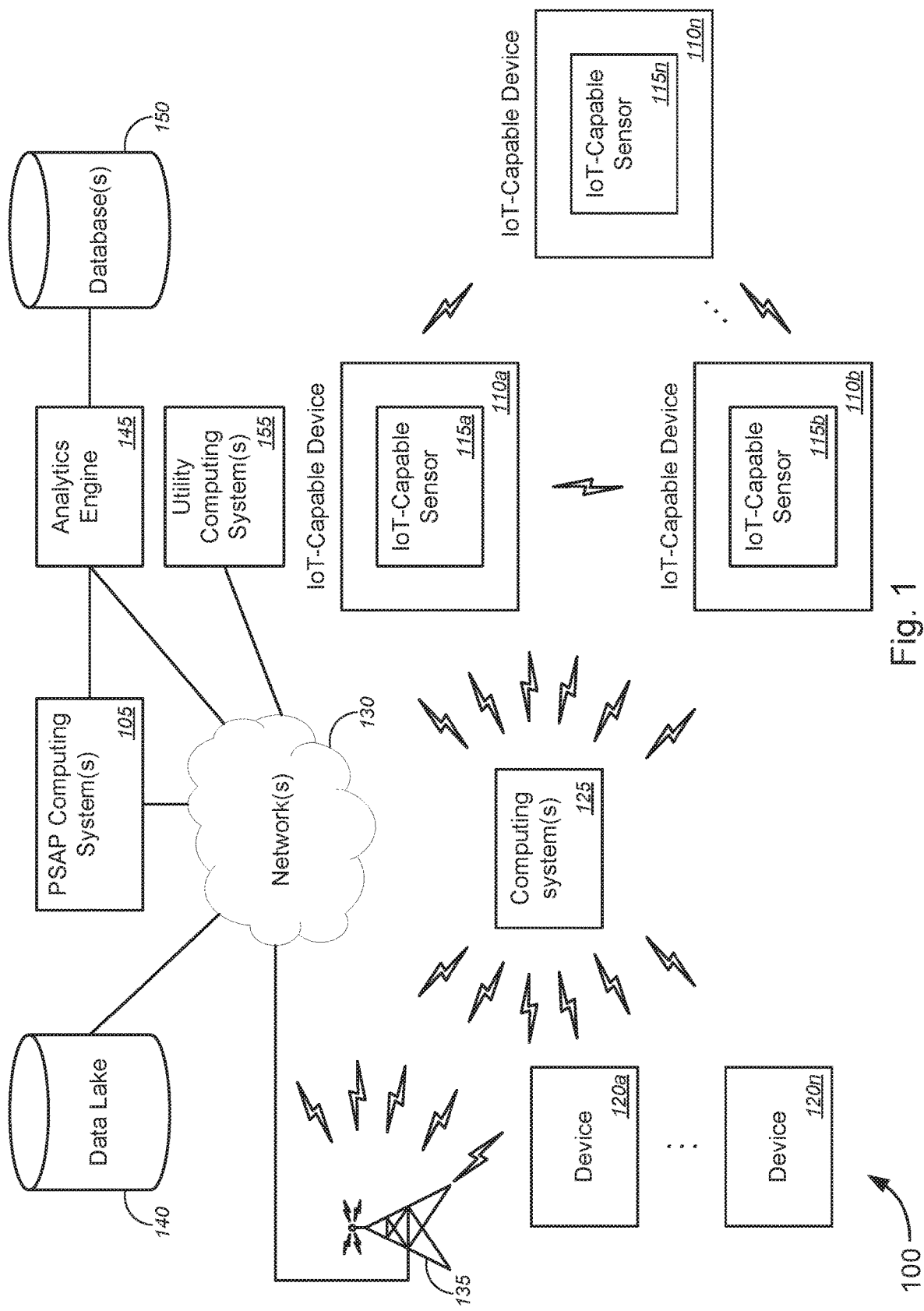
FIG. 1 is a schematic diagram illustrating a system for implementing Internet of Things ("IoT")-based smart environment functionality with a Public Safety Answering Point ("PSAP"), in accordance with various embodiments.

Various embodiments provide tools and techniques for implementing Internet of Things functionality with a Public Safety Answering Point ("PSAP"), and, in particular embodiments, to methods, systems, apparatus, and computer software for implementing smart environment functionality with a PSAP, which includes, without limitation, smart home, building, or customer premises functionality, smart vehicle functionality, smart utility functionality, smart roadway functionality, smart city functionality, and/or the like.

In various embodiments, a computing system located at a Public Safety Answering Point ("PSAP") might receive at least one first message indicative of an emergency situation occurring at a customer premises, analyze the at least one first message indicative of an emergency situation to determine one or more actions to be taken in response to the emergency situation, and identify one or more devices (e.g., one or more household devices associated with the customer premises, one or more first vehicular components associated with a vehicle known to be associated with a resident of the customer premises, one or more utility devices associated with a utility service provider supplying at least one of electrical power, gas, or water to the customer premises, one or more second vehicular components associated with each of one or more emergency response vehicles, or one or more emergency response devices associated with one or more emergency responders (e.g., one or more policemen, one or more firefighters, one or more medical personnel, one or more emergency medical technicians, etc.), etc.) for performing the determined one or more first actions. The computing system located at the PSAP then autonomously controls each of the identified one or more devices to perform tasks based on the determined one or more first actions to be taken, thereby implementing smart environment functionality (e.g., smart home, building, or customer premises functionality, smart vehicle functionality, smart utility functionality, smart roadway functionality, smart city functionality, and/or the like).

In some embodiments, the customer premises might include, without limitation, a home, building, or other customer premises structure (e.g., business premises, commercial office, school, industrial building, etc.), and/or the like. The computing system associated with implementing smart home, building, or customer premises functionality, in some cases, might include, without limitation, at least one of an IoT human interface device (or a single processor or a plurality of processors disposed therein, where such processor or processors may be physical or virtual in nature), a computing node that may be located within the customer premises, or other computing systems, which might include, but are not limited to, an IoT management node (that is either located within the customer premises or at a remote facility associated with a service provider), a server computer that is remote from the customer premises, a cloud computing system, a distributed computing system that integrates computing resources from two or more IoT-capable devices, or a combination of two or more of these computing systems, and/or the like. The computing system for the customer premises might be in communication with and controllable by a computing system located at the PSAP.

The IoT-capable sensors for implementing smart home, building, or customer premises functionality might include, but are not limited to, one or more temperature sensors (e.g., heat sensors, infrared sensors, thermometers, etc.), one or more light sensors (e.g., ambient light sensors, luminosity sensors, illuminance sensors, solar light sensors, etc.), one or more humidity sensors, one or more motion sensors, one or more cameras, one or more biometric sensors (e.g., fingerprint sensors, palm print sensors, footprint sensors, handprint sensors, voice identification sensors, iris scanners, retina scanners, etc.), one or more health sensors (e.g., heartbeat sensors, respiratory sensors, etc.), one or more location sensors (e.g., global positioning system ("GPS") devices, global navigation satellite system ("GNSS") devices, other location sensors, etc.), one or more air quality sensors, one or more carbon monoxide sensors, one or more smoke detectors, one or more water leak detectors, one or more contact sensors, one or more audio sensors, one or more accelerometers, one or more proximity sensors, one or more radiation sensors, one or more telecommunications signal sensors, and/or the like. In some embodiments, the IoT-capable sensors might further include, without limitation, one or more thermometers in at least one of the one or more rooms, one or more infrared ("IR") thermometers aimed at one or more positions in at least one of the one or more rooms, one or more air flow sensors in at least one of the one or more rooms, one or more air flow sensors in air ducts directed toward at least one of the one or more rooms, one or more humidity sensors in at least one of the one or more rooms, one or more outdoor humidity sensors, one or more moisture sensors, one or more nitrogen level sensors, one or more phosphate level sensors, one or more potassium level sensors, one or more wind sensors, one or more snow accumulation sensors, one or more indoor solar light sensors, one or more outdoor solar light sensors, one or more neighborhood weather station sensors, one or more regional weather station sensors, one or more motion detectors detecting proximity of people or animals, one or more particulate sensors, one or more optical particulate sensors, one or more electrostatic particulate sensors, one or more object position sensors, one or more flame detectors, one or more sound amplitude sensors, one or more sound propagation detectors, one or more frequency sensors, and/or the like.

According to some embodiments, the IoT-capable devices or household devices might include one or more of the aforementioned IoT-capable sensors, and/or might further include, without limitation, a desktop computer, a laptop computer, a tablet computer, a smart phone, a mobile phone, a portable gaming device, a database or data storage device, a network access point ("NAP"), a television or monitor, a set-top box ("STB"), a gaming console, an image capture device, a video capture device, a time piece (including, without limitation, a clock, a watch, or other time piece, and the like), a thermostat or environmental control system, a kitchen appliance (including, but not limited to, a microwave oven, a refrigerator, an oven, a range, a stove, an induction cooktop, a pressure cooker, a rice cooker, a bread maker, a coffee machine, a kettle, a dishwasher, a food thermometer, and/or the like), a medical device, a telephone system, a speaker, a media recording and/or playback device, a lighting system, a customer premises security control system, one or more dedicated remote control devices, one or more universal remote control devices, and/or other IoT-capable devices. In some cases, the other IoT-capable devices might include, without limitation, a personal digital assistant, a fitness tracking device, a printer, a scanner, an image projection device, a video projection device, a household appliance, a vehicle, an audio headset, earbuds, virtual reality goggles or headset, augmented reality goggles or headset, a door unlocking/locking system, an automated door opening/closing system, a window locking system, an automated window opening or closing system, an automated window covering control system, a smart window, a solar cell or solar cell array, an electrical outlet or smart node, a power strip or bar, a dimmer switch, a data port, a sprinkler system, exercise equipment, and/or the like. The IoT-capable devices or household devices might further include, but are not limited to, one or more of a furnace, an air conditioner, one or more automated skylight opening or closing systems, one or more humidifiers, one or more dehumidifiers, one or more ventilation fans, one or more automated lawn mowers, one or more automated trimmers, one or more sprinkler systems, one or more animal deterrent systems, one or more automated snow shovels, one or more automated snow blowers, one or more animal deterrent systems, one or more de-icing machines, one or more heating mats, one or more built-in radiant heat systems under the at least one pathway, one or more drones with mounted heat lamps, one or more air purifiers, one or more air filters, a fire suppression system, one or more emergency exit markers, one or more exit route markers, one or more lights (e.g., LEDs, indicator lights, warning lights, etc.), one or more fire suppression drones, one or more white noise generators, and/or the like.

Merely by way of example, in some instances, the vehicle might include a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like. The computing system for implementing smart vehicle functionality might include, but is not limited to, a vehicle node (or a single processor or a plurality of processors disposed therein, where such processor or processors may be physical or virtual in nature), a computing node that may be located within the vehicle, or other computing systems, which might include, but are not limited to, an IoT management node (that is either located within the vehicle, located at a customer premises associated with an owner of the vehicle, located at a business premises associated with a company that owns or operates the vehicle, or located at a service provider facility associated with a service provider that provides services to the owner of the vehicle), a server computer that is remote from the vehicle, a cloud computing system, a distributed computing system that integrates computing resources from two or more IoT-capable devices, or a combination of two or more of these computing systems, and/or the like. The computing system for the vehicle might be in communication with and controllable by a computing system located at the PSAP.

In some instances, the IoT-capable sensors for implementing smart vehicle functionality might include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more proximity sensors (e.g., vehicle camera-based collision avoidance system, the vehicle radar-based proximity detection system, the vehicle lidar-based proximity detection system, the vehicle sonar-based proximity detection system, etc.), one or more speed sensors, one or more cameras, one or more fuel level sensors (e.g., gasoline tank level sensors, diesel tank level sensors, battery charge level sensors, etc.), one or more location sensors (e.g., global positioning system ("GPS") devices, global navigation satellite system ("GNSS") devices, other location sensors, etc.), one or more other sensors, and/or the like. In some cases, the one or more other sensors might include, but are not limited to, one or more brake sensors, one or more air quality sensors, one or more carbon monoxide sensors, one or more smoke detectors, one or more fluid leak detectors, one or more contact sensors (e.g., for the door lock system, the hood ajar detector, the trunk ajar detector, the moon/sky light ajar detector, the window open detector, and/or the like), one or more audio sensors, one or more accelerometers, one or more telecommunications signal sensors, one or more tire pressure sensors, an engine temperature sensor, one or more fluid leak detectors, one or more occupant sensors, one or more impact sensors, or one or more suspension system diagnostic sensors, and/or the like.

In some embodiments, the IoT-capable devices or vehicular components might include one or more of the aforementioned IoT-capable sensors, and/or might further include, without limitation, a vehicle computer, a vehicle engine, a vehicle guidance system, an electronic throttle control ("ETC") system, a vehicle brake system, a vehicle gear system, a vehicle steering system, a vehicle head light system, a vehicle turn signal light system, a vehicle brake light system, a vehicle (analog or digital) instrument gauge cluster, a vehicle heads-up-display ("HUD") system, a vehicle-based transceiver or communications system, a navigation system, a vehicle display device, a vehicle speaker system, a vehicle (self-) diagnostic system, a vehicle hazard light system, a vehicle-based wireless access point ("WAP"), and/or other IoT-capable devices. In some cases, the other IoT-capable devices might include, without limitation, a door unlocking/locking system, an automated door opening/closing system, an automated window opening or closing system, an automated vehicle window covering control system, a data port, one or more vehicle climate control systems, one or more air purifiers, one or more air filters, one or more electrostatic particulate collecting tools, a fire suppression system, or one or more lights (e.g., reading lights, LEDs, indicator lights, warning lights, etc.), and/or the like.

In some instances, the one or more utilities might include, without limitation, one or more of an electrical utility, a water utility, or a gas utility, and/or the like. The computing system for implementing smart utility functionality might include, but is not limited to, a utility node (or a single processor or a plurality of processors disposed therein, where such processor or processors may be physical or virtual in nature), a management node that may be located in a neighborhood, at a premises of a utility, along the roadway or at a central location, or other computing systems, which might include, but are not limited to, an IoT management node (that may be located at a customer premises, located at a business premises, or located at a service provider facility), one or more roadway-embedded IoT management nodes, one or more municipal, state, federal, or private entity IoT management nodes, a server computer that is remote from the utility, a cloud computing system, a distributed computing system that integrates computing resources from two or more IoT-capable devices, or a combination of two or more of these computing systems, and/or the like. The computing system for the one or more utilities might be in communication with and controllable by a computing system located at the PSAP.

Merely by way of example, in some cases, the IoT-capable sensors for implementing smart roadway functionality might include, without limitation, one or more electrical power sensors, one or more water sensors, one or more water flow rate sensors, one or more gas sensors, one or more gas flow rate sensors, and/or the like.

In some embodiments, the IoT-capable devices for implementing smart utility functionality might include one or more of the aforementioned IoT-capable sensors and/or might further include, without limitation, one or more electrical utility devices (e.g., electric lines, solar panels, etc.), one or more water utility devices (e.g., water valves, water pipes, etc.), and/or one or more gas utility devices (e.g., gas valves, gas pipes, etc.).

According to some embodiments, the roadway might include, without limitation, at least one of a local road, a main road, a highway, an airport apron, an airport ramp, an airport runway, a canal, a lock, or a waterway, and/or the like. The computing system for implementing smart roadway functionality might include, but is not limited to, a vehicle node (or a single processor or a plurality of processors disposed therein, where such processor or processors may be physical or virtual in nature), a management node that may be located either in, on, or along the roadway or at a central location, or other computing systems, which might include, but are not limited to, an IoT management node (that is either located within the vehicle, located at a customer premises associated with an owner of the vehicle, located at a business premises associated with a company that owns or operates the vehicle, or located at a service provider facility associated with a service provider that provides services to the owner of the vehicle), one or more roadway-embedded IoT management nodes, one or more municipal, state, federal, or private entity IoT management nodes, a computing system disposed at a vehicle traffic control center, a server computer that is remote from the vehicle, a cloud computing system, a distributed computing system that integrates computing resources from two or more IoT-capable devices, or a combination of two or more of these computing systems, and/or the like. The computing system for the one or more roadways might be in communication with and controllable by a computing system located at the PSAP.

Merely by way of example, in some cases, the IoT-capable sensors for implementing smart roadway functionality might include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more humidity sensors, one or more motion sensors, one or more structural integrity sensors, one or more pressure sensors, one or more air quality sensors, one or more other sensors, and/or the like. In some cases, the one or more other sensors might include, but are not limited to, one or more communications signal detectors, one or more seismic sensors, one or more weather station sensors, one or more moisture sensors, one or more wind sensors, one or more particulate sensors, one or more impact sensors, one or more stress sensors, or one or more location sensors, and/or the like. In some instances, the one or more IoT-capable sensors might further include IoT-capable sensors (which are described in detail above, for example) in each of one or more vehicles travelling on the roadway. In some cases, the one or more structural integrity sensors might include, without limitation, at least one of two or more global positioning system sensors or two or more relative position sensors, where the sensor data from these sensors might include data indicating a change in position of one structural integrity sensor relative to another structural integrity sensor beyond a predetermined threshold amount, thereby indicating that there might be damage to the roadway, seismic activity, and/or the like.

In some embodiments, the IoT-capable devices for implementing smart roadway functionality might include one or more of the aforementioned IoT-capable sensors and/or might further include, without limitation, one or more power generation nodes, one or more battery charging nodes, one or more communications systems, one or more traffic control signal devices, one or more street lamps, one or more dynamic lane change markers, one or more vehicular components in each of one or more vehicles travelling on the roadway (including, but not limited to, a vehicle computer, a vehicle engine, an ETC system, a vehicle brake system, a vehicle gear system, a vehicle steering system, a vehicle light system, a vehicle (analog or digital) instrument gauge cluster, a navigation system, a vehicle (self-) diagnostic system, a vehicle-based transceiver or communications system, and/or the like), a WAP, and/or other IoT-capable devices. In some cases, the other IoT-capable devices might include, without limitation, one or more air purifiers, one or more air filters, one or more electrostatic particulate collecting tools, a fire suppression system, or one or more lights (e.g., LEDs, indicator lights, warning lights, etc.), and/or the like.

According to some embodiments, the population area might include, but is not limited to, a sub-division, a collection of sub-divisions, a village, a town, a city, a municipal region, a state, a province, a collection of states, a collection of provinces, an island, a collection of islands, a country, a collection of countries, a continent, a collection of continents, a space station, a space vehicle, an orbital habitat, or a habitat disposed on a different planetary body, or the like (collectively referred to herein as "a population area," "a smart city," or the like). In some embodiments, the computing system for implementing smart city functionality might include, without limitation, at least one of a central node (or a single processor or a plurality of processors disposed therein, where such processor or processors may be physical or virtual in nature), a management node that may be located within at least a portion of the population area, or other computing systems, which might include, but are not limited to, an IoT management node (that may be located at a service provider facility associated with a service provider that provides services to at least portions of the population area), one or more roadway-embedded IoT management nodes, one or more municipal, state, federal, or private entity IoT management nodes, a computing system disposed at a vehicle traffic control center, a server computer that serves the population area, a server computer that is remote from the population area, a cloud computing system, a distributed computing system that integrates computing resources from two or more IoT-capable devices, or a combination of two or more of these computing systems, and/or the like. The computing system for the one or more smart cities might be in communication with and controllable by a computing system located at the PSAP.

Merely by way of example, in some aspects, the IoT-capable sensors for implementing smart city functionality might include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more weather sensors, one or more motion sensors, one or more structural integrity sensors, one or more pressure sensors, one or more air quality sensors, one or more other sensors, and/or the like. In some cases, the one or more other sensors might include, but are not limited to, one or more communications signal detectors, one or more seismic sensors, one or more weather station sensors, one or more moisture sensors, one or more humidity sensors, one or more wind sensors, one or more particulate sensors, one or more impact sensors, one or more stress sensors, or one or more location sensors, and/or the like. In some instances, the one or more IoT-capable sensors might further comprise IoT-capable sensors (which are described in detail above, for example) in each of one or more vehicles travelling on the roadway. In some cases, the one or more structural integrity sensors might include, without limitation, at least one of two or more global positioning system sensors or two or more relative position sensors that are embedded in or disposed on one or more exterior surfaces of at least one of portions of one or more roadways (including, but not limited to, at least one of a local road, a main road, a highway, an airport apron, an airport ramp, an airport runway, a canal, a lock, or a waterway, and/or the like), portions of one or more public pathways (e.g., sidewalks, trails, public moving pathways, public escalators, public elevators, etc.), portions of one or more buildings (e.g., government buildings, other public buildings, etc.), portions of one or more public centers, portions of one or more airport terminal buildings, portions of one or more airport hangars and service buildings, portions of one or more railway facilities, portions of one or more railway tracks, portions of one or more marine ports, portions of one or more public transit structures, portions of one or more utility structures, portions of one or more public monuments or public art pieces, bridges, tunnels, and/or the like, where the sensor data from these sensors might comprise data indicating a change in position of one structural integrity sensor relative to another structural integrity sensor beyond a predetermined threshold amount, thereby indicating that there might be damage to corresponding at least one of one or more roadways, one or more public pathways, one or more buildings, one or more public centers, one or more airport terminal buildings, one or more airport hangars and service buildings, one or more railway facilities, one or more railway tracks, one or more marine ports, one or more public transit structures, one or more utility structures, one or more public monuments or public art pieces, bridges, or tunnels, and/or the like. According to some embodiments, the type of travel path may vary along the traveled path, which might be at least one of asphalt path, concrete path, crushed rock path, bridge, railway crossing, runway, and/or the like, each with specific sensors to accommodate the differences in each type of travel path and/or to accommodate a change or transition in physical traveled path characteristics when two or more types of travel path abut each other (which might require one or more changes in communication technologies due to the characteristics of the changing physical travel path).

In some embodiments, the IoT-capable devices for implementing smart city functionality might include one or more of the aforementioned IoT-capable sensors and/or might further include, without limitation, one or more power generation nodes, one or more battery charging nodes, one or more communications systems, one or more traffic control signal devices, one or more street lamps, one or more dynamic lane change markers, one or more vehicle systems or vehicular components in each of one or more vehicles travelling on the roadway (including, but not limited to, a vehicle computer, a vehicle engine, an electronic throttle control ("ETC") system, a vehicle brake system, a vehicle gear system, a vehicle steering system, a vehicle light system, a vehicle (analog or digital) instrument gauge cluster, a navigation system, a vehicle (self-) diagnostic system, a vehicle-based transceiver or communications system, and/or the like), one or more public transit vehicle systems in each of one or more public transit vehicles travelling on the roadway, waterway, and/or railway (including, but not limited to, a vehicle computer, a vehicle engine, an ETC system, a vehicle brake system, a vehicle gear system, a vehicle steering system, a vehicle light system, a vehicle (analog or digital) instrument gauge cluster, a navigation system, a vehicle (self-) diagnostic system, a vehicle-based transceiver or communications system, and/or the like), one or more public display devices (e.g., electronic billboards, digital public signs, public televisions, public monitors, public touchscreen interface displays, public directories, and/or the like), one or more power distribution systems, one or more railway systems (including, without limitation, train control systems, railway switch controls, railway crossing controls, rail track power systems, rail track maintenance systems such as rail lubrication systems and switch heaters, track diagnostic systems, railway signal diagnostic systems, and/or the like), one or more user devices associated with users who are currently located in the population area, one or more cleaning systems, one or more grounds-keeping systems, one or more emergency (response) systems, one or more transceivers, a WAP, and/or other IoT-capable devices. In some cases, the other IoT-capable devices might include, without limitation, a door unlocking/locking system installed in one or more public buildings or facilities, an automated door opening/closing system installed in one or more public buildings or facilities, an automated window opening or closing system installed in one or more public buildings or facilities, an automated window covering control system installed in one or more public buildings or facilities, a data port, one or more building climate control systems, one or more public transport climate control systems, one or more air purifiers, one or more air filters, one or more electrostatic particulate collecting tools, a fire suppression system, or one or more lights (e.g., reading lights, LEDs, indicator lights, warning lights, etc.), and/or the like.

In some aspects, two or more of the smart home, building, or customer premises functionality, the smart vehicle functionality, the smart utility, the smart roadway functionality, and/or the smart city functionality might be implemented in conjunction in response to an emergency situation by a PSAP computing system, perhaps in an integrated manner to expand upon and otherwise enhance the overall smart environment functionality to provide seamless IoT functionality throughout the various living spaces.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network virtualization technology, network configuration technology, virtualized network function technology, Internet of Things ("IoT") technology, PSAP technology, machine-to-machine communication, and/or the like. In other aspects, certain embodiments can improve the functioning of user equipment or systems themselves (e.g., automated home systems, IoT device networks, IoT devices, IoT systems, human interface devices, vehicle systems, roadway integration systems, municipal operations systems, PSAP systems, etc.), for example, by autonomously analyzing a first message indicative of an emergency from one or more to determine actions to be taken, by autonomously identifying one or more devices (e.g., one or more household devices associated with the customer premises, one or more first vehicular components associated with a vehicle known to be associated with a resident of the customer premises, one or more utility devices associated with a utility service provider supplying at least one of electrical power, gas, or water to the customer premises, one or more second vehicular components associated with each of one or more emergency response vehicles, or one or more emergency response devices associated with one or more emergency responders, etc.) for performing the determined actions to be taken, and by autonomously controlling each of the identified one or more devices to perform tasks based on the determined actions to be taken, thereby implementing smart environment functionality (e.g., smart home, building, or customer premises functionality, smart vehicle functionality, smart roadway functionality, smart city functionality, and so on) with a PSAP, and/or the like.

In particular, to the extent any abstract concepts are present in the various embodiments, those concepts can be implemented as described herein by devices, software, systems, and methods that involve specific novel functionality (e.g., steps or operations), such as autonomously analyzing a first message indicative of an emergency to determine actions to be taken, by autonomously identifying one or more devices for performing the determined actions to be taken, and by autonomously controlling each of the identified one or more devices to perform tasks based on the determined actions to be taken, which improves the interaction amongst IoT-capable devices and sensors disposed within various environments and improves the interaction between the computing systems, PSAPs, and the various IoT devices in the various environments, improves the functionalities of other devices and systems in the various environments, and/or the like, to name a few examples, that extend beyond mere conventional computer processing operations. These functionalities can produce tangible results outside of the implementing computer system, including, merely by way of example, improved functionality of devices and systems disposed in the various environments, improved user experience with IoT devices, improved responses to emergency situations, improved lifestyle experience of the user with respect to connected devices in the user's life in the home or customer premises, in the vehicles, on the roadways, and in the city/population area in which the user lives, and/or the like, at least some of which may be observed or measured by users and/or service providers.

In an aspect, a method might include receiving, with a computing system at a public safety answering point ("PSAP"), at least one first message indicative of an emergency situation occurring at a customer premises and analyzing, with the computing system, the at least one first message to determine one or more first actions to be taken in response to the emergency situation. The method might also comprise identifying, with the computing system, at least one of one or more household devices associated with the customer premises, one or more first vehicular components associated with a vehicle known to be associated with a resident of the customer premises, one or more utility devices associated with a utility service provider supplying at least one of electrical power, gas, or water to the customer premises, one or more second vehicular components associated with each of one or more emergency response vehicles, one or more emergency response devices associated with one or more emergency responders for performing the determined one or more first actions to be taken, based at least in part on the analysis of the at least one first message. The method might additionally include autonomously controlling, with the computing system, at least one of the identified one or more household devices, the identified one or more first vehicular components, the identified one or more utility devices, the identified one or more second vehicular components, or the identified one or more emergency response devices to perform one or more tasks, based at least in part on the determined one or more first actions to be taken.

In some embodiments, receiving the at least one first message indicative of an emergency might comprise receiving, with the computing system, at least one first sensor data indicative of the emergency situation from each of one or more Internet of Things ("IoT")-capable devices via machine-to-machine communications, each of the one or more IoT-capable devices comprising one or more first sensors that collect the at least one first sensor data at the customer premises. The one or more first sensors might comprise at least one of one or more thermometers in one or more rooms of the customer premises, one or more infrared ("IR") thermometers aimed at one or more positions in the one or more rooms, one or more air flow sensors in the one or more rooms, one or more air flow sensors in air ducts directed toward the one or more rooms, one or more indoor solar light sensors, one or more outdoor solar light sensors, one or more outdoor wind sensors, one or more neighborhood weather station sensors, one or more regional weather station sensors, one or more motion detectors detecting presence of people or animals in at least one of the one or more rooms or outside the customer premises, one or more humidity sensors in the one or more rooms, one or more smoke detectors detecting smoke in the one or more rooms, one or more gas detection sensors detecting gas in the one or more rooms, one or more biometric sensors identifying at least one person, or one or more health sensors detecting health information for at least one person.

The at least one first sensor data that is received from each of the one or more IoT-capable devices each comprises sensor data that exceeds a predetermined threshold for each corresponding type of sensor, wherein sensor data that does not exceed the predetermined threshold for each corresponding type of sensor is prevented from being sent to the computing system. In a non-limiting example, if the one or more sensors detect a certain amount of smoke or an irregular heartbeat of a customer, then the one or more devices containing the sensors might determine that there is a fire or that a person is having a heart attack, respectively, and might send a first message indicative of an emergency to a computing system located at the PSAP.

In some cases, receiving the at least one first sensor data from each of the one or more IoT-capable devices via machine-to-machine communications might comprise receiving, with the computing system, at least one first sensor data from each of the one or more IoT-capable devices via machine-to-machine communications, via one or more first application programming interfaces ("APIs") established between the computing system and each of the one or more IoT-capable devices.

In some embodiments, the at least one first sensor data might indicate at least one of a type of emergency situation, a location of the emergency situation within the customer premises, locations of live electrical wiring throughout the customer premises, locations of gas sources throughout the customer premises, locations of water sources throughout the customer premises, a location of at least one person within the customer premises, an identity of the at least one person within the customer premises, a location of at least one animal within the customer premises, or health information associated with the at least one person within the customer premises. This information may be displayed, via the PSAP computing system, to one or more display devices located at the PSAP, at a customer premises, in an emergency response vehicle, at a utility provider, and/or the like.

Additionally, in some cases, autonomously controlling the at least one of the identified one or more household devices, the identified one or more first vehicular components, the identified one or more utility devices, the identified one or more second vehicular components, or the identified one or more emergency response devices to perform the one or more tasks might include sending, with the computing system, one or more first control instructions to the at least one of the identified one or more household devices, the identified one or more first vehicular components, the identified one or more utility devices, the identified one or more second vehicular devices, or the identified one or more emergency response devices to perform the one or more tasks, based at least in part on the determined one or more first actions to be taken. The control instructions might cause the one or more identified devices to perform one or more actions to address the emergency situation.

In various embodiments, autonomously controlling the at least one of the identified one or more household devices, the identified one or more first vehicular components, the identified one or more utility devices, the identified one or more second vehicular components, or the identified one or more emergency response devices to perform the one or more tasks might include autonomously controlling, with the computing system, the at least one of the identified one or more household devices, the identified one or more first vehicular components, the identified one or more utility devices, the identified one or more second vehicular components, or the identified one or more emergency response devices, via one or more second APIs established between the computing system and each of at least one of the identified one or more household devices, the identified one or more first vehicular components, the identified one or more utility devices, the identified one or more second vehicular components, or the identified one or more emergency response devices.

In various instances, the identified one or more household devices comprise one or more of a furnace, an air conditioner, one or more thermostats, one or more automated window opening or closing systems, one or more automated door opening or closing systems, one or more automated skylight opening or closing systems, one or more automated window covering systems, one or more humidifiers, one or more dehumidifiers, one or more ventilation fans, one or more cameras, one or more automated lighting systems, one or more smoke or gas detectors, one or more automated gas intake valves, one or more water intake valves, or one or more user devices associated with at least one person located in the customer premises. Autonomously controlling the at least one of the identified one or more household devices, the identified one or more first vehicular components, the identified one or more utility devices, the identified one or more second vehicular components, or the identified one or more emergency response devices to perform the one or more tasks might include autonomously controlling, with the computing system, operation of at least one of the furnace, the air conditioner, the one or more thermostats, the one or more automated window opening or closing systems, the one or more automated door opening or closing systems, the one or more automated skylight opening or closing systems, the one or more automated window covering systems, the one or more humidifiers, the one or more dehumidifiers, the one or more ventilation fans, the one or more cameras, the one or more automated lighting systems, the one or more smoke or gas detectors, the one or more automated gas or water intake valves, or the one or more user devices associated with the at least one person located in the customer premises, and/or the like. In a non-limiting example, the PSAP computing system might cause at least one of the furnace to turn on or off, the air conditioner to turn on or off, the one or more thermostats to increase temperature or decrease temperature, the one or more automated window opening or closing systems to open/close or lock/unlock one or more windows, the one or more automated door opening or closing systems to open/close or lock/unlock one or more doors, the one or more automated skylight opening or closing systems to open/close or lock/unlock one or more skylights, the one or more automated window covering systems to cover or uncover one or more windows, the one or more humidifiers to turn on or off, the one or more dehumidifiers to turn on or off, the one or more ventilation fans to turn on or off, the one or more cameras to turn on or off, to record, etc., the one or more automated lighting systems to turn on or off, direct a user to an exit, etc., the one or more smoke or gas detectors to turn on or off, the one or more automated gas or water intake valves to turn on or off, or the one or more user devices associated with the at least one person located in the customer premises to display one or more instructions to address the emergency situation, to determine a location of a user within the customer premises, and/or the like.

In some embodiments, the identified one or more first vehicular components or the identified one or more second vehicular components comprise at least one of a vehicle brake system, a vehicle gear system, a vehicle electronic throttle control system, a vehicle guidance system, a vehicle steering system, a vehicle turn signal system, a vehicle heads-up display system, a vehicle digital instrument gauge cluster, a vehicle display device, a vehicle navigation system, a vehicle speaker system, a vehicle door locking or unlocking system, an automatic vehicle door opening or closing system, a vehicle window opening or closing system, or a vehicle sun-roof or moon-roof opening or closing system. Autonomously controlling the at least one of the identified one or more household devices, the identified one or more first vehicular components, the identified one or more utility devices, the identified one or more second vehicular components, or the identified one or more emergency response devices to perform the one or more tasks might include controlling, with the computing system, operation of the at least one of the vehicle brake system, the vehicle gear system, the vehicle electronic throttle control system, the vehicle steering system, the vehicle turn signal system, the vehicle heads-up display system, the vehicle digital instrument gauge cluster, the vehicle display device, the vehicle navigation system, the vehicle speaker system, the vehicle door locking or unlocking system, the automatic vehicle door opening or closing system, the vehicle window opening or closing system, or the vehicle sun-roof or moon-roof opening or closing system. Additionally and/or alternatively, autonomously controlling the at least one of the identified one or more household devices, the identified one or more first vehicular components, the identified one or more utility devices, the identified one or more second vehicular components, or the identified one or more emergency response devices to perform the one or more tasks might additionally include controlling, with the computing system, the vehicle display device and might cause, with the computing system, the vehicle display device to display information associated with the emergency situation. Further, autonomously controlling the one or more first or second vehicular components might cause one or more vehicles associated with the customer premises to move out of a driveway or move out of a path of the one or more emergency response vehicles, might cause one or more vehicles associated with one or more emergency responders to drive to the emergency situation, and/or the like.

In some cases, the identified one or more utility devices might comprise at least one of one or more electric utility devices, one or more gas utility devices, or one or more water utility devices. Autonomously controlling the at least one of the identified one or more household devices, the identified one or more first vehicular components, the identified one or more utility devices, the identified one or more second vehicular components, or the identified one or more emergency response devices to perform the one or more tasks might include controlling, with the computing system, at least one of the one or more electric utility devices, the one or more gas utility devices, or the one or more water utility devices to perform at least one of turn on, turn off, reroute flow, or adjust flow amount.

In various embodiments, the one or more emergency response devices might include at least one of a smartphone, a tablet, a laptop, a global positioning system ("GPS") device, or a personal digital assistant, and/or the like. Autonomously controlling the at least one of the identified one or more household devices, the identified one or more first vehicular components, the identified one or more utility devices, the identified one or more second vehicular components, or the identified one or more emergency response devices to perform the one or more tasks might include sending, with the computing system, at least one of a key or a passcode to the one or more emergency response devices, wherein the at least one of the key or the passcode allows the one or more emergency response devices to control at least one of the identified one or more household devices, the identified one or more first vehicular components, or the identified one or more utility devices. The key or passcode might be sent after either a customer, PSAP computing system, PSAP operator, emergency responder, and/or the like confirms that there is an emergency at the customer premises.

In some embodiments, the method might additionally include receiving, with the computing system, a first location associated with at least one of the identified one or more household devices, the identified one or more first vehicular components, or the identified one or more utility devices and tracking, with the computing system, a second location associated with at least one of the identified one or more second vehicular components or the identified one or more emergency response devices. Based on a determination that the first location and the second location overlap, the method might include autonomously controlling, with the computing system, at least one of the identified one or more household devices, the identified one or more first vehicular components, the identified one or more utility devices, the identified one or more second vehicular components, or the identified one or more emergency response devices to perform one or more additional tasks.

In another aspect, a system might comprise a computing system located at a PSAP. The computing system might comprise a first transceiver, at least one first processor, and a first non-transitory computer readable medium communicatively coupled to the at least one first processor. The first non-transitory computer readable medium might have stored thereon computer software comprising a first set of instructions that, when executed by the at least one first processor, causes the computing system to: receive at least one first message indicative of an emergency situation occurring at a customer premises via the first transceiver; analyze the at least one first message to determine one or more first actions to be taken in response to the emergency situation; identify at least one of one or more household devices associated with the customer premises, one or more first vehicular components associated with a vehicle known to be associated with a resident of the customer premises, one or more utility devices associated with a utility service provider supplying at least one of electrical power, gas, or water to the customer premises, one or more second vehicular components associated with each of one or more emergency response vehicles, or one or more emergency response devices associated with one or more emergency responders for performing the determined one or more first actions to be taken, based at least in part on the analysis of the at least one first message; and autonomously control at least one of the identified one or more household devices, the identified one or more first vehicular components, the identified one or more utility devices, the identified one or more second vehicular components, or the identified one or more emergency response devices to perform one or more tasks, based at least in part on the determined one or more first actions to be taken. The at least one of the identified one or more household devices, the identified one or more first vehicular components, the identified one or more utility devices, the identified one or more second vehicular components, or the identified one or more emergency response devices might each comprise a second transceiver, at least one second processor, and a second non-transitory computer readable medium communicatively coupled to the at least one second processor. The second non-transitory computer readable medium might have stored thereon computer software comprising a second set of instructions that, when executed by the at least one second processor, causes the at least one of the identified one or more household devices, the identified one or more first vehicular components, the identified one or more utility devices, the identified one or more second vehicular components, or the identified one or more emergency response devices to: receive control instructions from the computing system and perform the one or more tasks based on the received control instructions to address the emergency situation.

In yet another aspect, an apparatus might be located at a PSAP and might comprise one or more first processors and a non-transitory computer readable medium communicatively coupled with the one or more first processors. The non-transitory computer readable medium might have stored thereon computer software comprising a set of instructions that, when executed by the one or more first processors, causes the apparatus to: receive at least one first message indicative of an emergency situation occurring at a customer premises; analyze the at least one first message to determine one or more first actions to be taken in response to the emergency situation; identify at least one of one or more household devices associated with the customer premises, one or more first vehicular components associated with a vehicle known to be associated with a resident of the customer premises, one or more utility devices associated with a utility service provider supplying at least one of electrical power, gas, or water to the customer premises, one or more second vehicular components associated with each of one or more emergency response vehicles, one or more emergency response devices associated with one or more emergency responders for performing the determined one or more first actions to be taken, based at least in part on the analysis of the at least one first message; autonomously control at least one of the identified one or more household devices, the identified one or more first vehicular components, the identified one or more utility devices, the identified one or more second vehicular components, or the identified one or more emergency response devices to perform one or more tasks, based at least in part on the determined one or more first actions to be taken.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-9 illustrate some of the features of the method, system, and apparatus for implementing Internet of Things functionality with a Public Safety Answering Point ("PSAP"), and, in particular embodiments, to methods, systems, apparatus, and computer software for implementing smart environment functionality with a PSAP, which includes, without limitation, smart home, building, or customer premises functionality, smart vehicle functionality, smart utility, smart roadway functionality, smart city functionality, and/or the like, as referred to above. The description of the illustrated methods, systems, and apparatuses shown in FIGS. 1-9 is provided for purposes of illustration and should not be considered to limit the scope of the different embodiments.

With reference to the figures, FIG. 1 is a schematic diagram illustrating a system 100 for implementing Internet of Things ("IoT")-based smart environment functionality with a Public Safety Answering Point ("PSAP"), in accordance with various embodiments. In FIG. 1, system 100 might comprise one or more PSAP computing systems 105 located at a PSAP, one or more IoT-capable devices 110a-110n (collectively, "IoT-capable devices 110" or the like), one or more IoT-capable sensors 115a-115n (collectively, "IoT-capable sensors 115" or the like), and one or more devices 120a-120n (collectively, "devices 120" or the like). In some cases, the system 100 might comprise at least one local computing system 125 that is local to one or more of at least one IoT-capable device 110, at least one IoT-capable sensor 115, at least one device 120, or a customer premises/vehicle/roadway/portion of a population area in which the one or more of the at least one IoT-capable device 110, the at least one IoT-capable sensor 115, or the at least one device 120 are disposed. In additional embodiments, the system 100 might also include one or more utility computing system(s) 155.

The one or more PSAP computing systems 105 might be accessible by any of the at least one local computing system 125, the IoT-capable devices 110, the IoT-capable sensors 115, the devices 120, utility computing systems 155, and/or the like, via one or more networks 130, and in some cases, via one or more telecommunications relay systems 135. In some embodiments, one or more of the devices 120, the local computing system 125, the IoT-capable devices 110, and/or the IoT-capable sensors 115 may be integrated into a single physical unit.

Each of the PSAP computing systems 105 might include, but are not limited to, at least one of a remote IoT management node, a server computer, a cloud computing system, and/or the like, each of which may be located outside of (or remote from) the customer premises/vehicle/roadway/portion of the population area in which the one or more of the at least one IoT-capable device 110, the at least one IoT-capable sensor 115, or the at least one device 120 are disposed. The PSAP computing system 105 might be configured to control the local computing system(s) 125, the IoT-capable devices 110, the IoT-capable sensors 115, the devices 120, the utility computing system 155, and/or the like, via one or more networks 130, and in some cases, via one or more telecommunications relay systems 135.

In some cases, each of the local computing systems 125 might include, but are not limited to, at least one of an IoT human interface device (or a single processor or a plurality of processors disposed therein, where such processor or processors may be physical or virtual in nature), a vehicle node, a central node, a computing node, an IoT management node, one or more roadway-embedded IoT management nodes, a distributed computing system that integrates computing resources from two or more IoT-capable devices, and/or the like, each of which may be located in a customer premises/vehicle/roadway/portion of the population area in which the one or more of the at least one IoT-capable device 110, the at least one IoT-capable sensor 115, or the at least one device 120 are disposed. The local computing system 125 might be configured to control the IoT-capable devices 110, the IoT-capable sensors 115, the devices 120, and/or the like, via one or more networks 130, and in some cases, via one or more telecommunications relay systems 135.

According to some embodiments, the IoT-capable devices 110 might include, without limitation, at least one of a desktop computer, a laptop computer, a tablet computer, a smart phone, a mobile phone, a portable gaming device, a database or data storage device, a network access point ("NAP"), a television or monitor, a set-top box ("STB"), a gaming console, an image capture device, a video capture device, a time piece (including, without limitation, a clock, a watch, or other time piece, and the like), a thermostat or environmental control system, a kitchen appliance (including, but not limited to, a microwave oven, a refrigerator, an oven, a range, a stove, an induction cooktop, a pressure cooker, a rice cooker, a bread maker, a coffee machine, a kettle, a dishwasher, a food thermometer, and/or the like), a medical device, a telephone system, a speaker, a media recording and/or playback device, a lighting system, a customer premises security control system, one or more dedicated remote control devices, one or more universal remote control devices, a personal digital assistant, a fitness tracking device, a printer, a scanner, an image projection device, a video projection device, a household appliance, a vehicle, an audio headset, earbuds, virtual reality goggles or headset, augmented reality goggles or headset, a door unlocking/locking system, an automated door opening/closing system, a window locking system, an automated window opening or closing system, an automated window covering control system, a smart window, a solar cell or solar cell array, an electrical outlet or smart node, a power strip or bar, a dimmer switch, a data port, a sprinkler system, exercise equipment, a smoke detector, a gas detector, a biometric sensor, a health sensor, an array of one or more sensors, and/or the like. The IoT-capable devices 110, in some cases, might further include, but are not limited to, one or more of a furnace, an air conditioner, one or more automated skylight opening or closing systems, one or more humidifiers, one or more dehumidifiers, one or more ventilation fans, one or more automated lawn mowers, one or more automated trimmers, one or more sprinkler systems, one or more fertilizer dispensers, one or more animal deterrent systems, one or more automated snow shovels, one or more automated snow blowers, one or more animal deterrent systems, one or more speakers warning people about machinery in use, one or more lights or display devices warning people about machinery in use, one or more de-icing machines, one or more heating mats, one or more built-in radiant heat systems under the at least one pathway, one or more drones with mounted heat lamps, one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, one or more electrostatic particulate collecting tools, a washing machine, a clothes dryer, a fire suppression system, one or more emergency exit markers, one or more exit route markers, one or more lights (e.g., LEDs, indicator lights, warning lights, etc.), one or more fire suppression drones, one or more white noise generators, and/or the like.

In some embodiments, the IoT-capable devices 110 might further include, without limitation, at least one of one or more vehicle systems or vehicular components in each of one or more vehicles (e.g., private vehicles, company vehicles, commercial, public transit vehicles, emergency responder vehicles, etc.) travelling on the roadway or located at a customer premises (including, but not limited to, a vehicle computer, a vehicle engine, an electronic throttle control ("ETC") system, a vehicle brake system, a vehicle gear system, a vehicle steering system, a vehicle light system (e.g., vehicle head light system, vehicle turn signal light system, vehicle brake light system, vehicle hazard light system, etc.), a vehicle (analog or digital) instrument gauge cluster, a navigation system, a vehicle (self-) diagnostic system, a vehicle-based transceiver or communications system, a vehicle-based wireless access point ("WAP"), a vehicle door unlocking/locking system, an automated vehicle door opening/closing system, an automated vehicle window opening or closing system, an automated vehicle window covering control system, one or more vehicle climate control systems, and/or the like), one or more public display devices (e.g., electronic billboards, digital public signs, public televisions, public monitors, public touchscreen interface displays, public directories, and/or the like), one or more utility distribution systems (including, without limitation, one or more electric utility devices, one or more gas utility devices, or one or more water utility devices, and/or the like), one or more railway systems (including, without limitation, train control systems, railway switch controls, railway crossing controls, rail track power systems, rail track maintenance systems such as rail lubrication systems and switch heaters, track diagnostic systems, railway signal diagnostic systems, and/or the like), one or more user devices associated with users who are currently located in the population area, one or more cleaning systems, one or more grounds-keeping systems, one or more emergency (response) systems, one or more transceivers, a door unlocking/locking system installed in one or more public buildings or facilities, an automated door opening/closing system installed in one or more public buildings or facilities, an automated window opening or closing system installed in one or more public buildings or facilities, an automated window covering control system installed in one or more public buildings or facilities, one or more building climate control systems, one or more public transport climate control systems, one or more air purifiers, one or more air filters, one or more electrostatic particulate collecting tools, a fire suppression system, or one or more lights (e.g., reading lights, LEDs, indicator lights, warning lights, etc.), and/or the like. In some instances, the IoT-capable devices 110 might further include, but are not limited to, one or more power generation nodes, one or more battery charging nodes, one or more communications systems, one or more traffic control signal devices, one or more street lamps, one or more dynamic lane change markers, and/or the like.

In some embodiments, the IoT-capable sensors 115—which might be disposed within, on a surface of, or within but extending to a surface of, each of the IoT-capable devices 110—might include, but are not limited to, at least one of one or more temperature sensors (e.g., heat sensors, infrared sensors, thermometers, etc.), one or more light sensors (e.g., ambient light sensors, luminosity sensors, illuminance sensors, solar light sensors, etc.), one or more humidity sensors (e.g., room humidity sensors, outdoor humidity sensors, etc.), one or more moisture sensors, one or more water sensors, one or more motion sensors, one or more cameras, one or more biometric sensors (e.g., fingerprint sensors, palm print sensors, footprint sensors, handprint sensors, voice identification sensors, iris scanners, retina scanners, etc.), one or more location sensors (e.g., global positioning system ("GPS") devices, global navigation satellite system ("GNSS") devices, other location sensors, etc.), one or more air quality sensors, one or more carbon monoxide sensors, one or more smoke detectors, one or more gas detectors, one or more water leak detectors, one or more contact sensors (e.g., for building/vehicle door lock system, for building/vehicle moon/sky light ajar detector, for building/vehicle window open detector, for vehicle hood ajar detector, for vehicle trunk ajar detector, and/or the like), one or more audio sensors, one or more accelerometers, one or more proximity sensors, one or more seismic sensors, one or more radiation sensors, one or more telecommunications signal sensors or communications signal detectors, one or more biometric sensors identifying at least one person, or one or more health sensors, and/or the like. In some cases, the IoT-capable sensors 115 might further include, without limitation, one or more thermometers in at least one of the one or more rooms, one or more infrared ("IR") thermometers aimed at one or more positions in at least one of the one or more rooms, one or more air flow sensors in at least one of the one or more rooms, one or more air flow sensors in air ducts directed toward at least one of the one or more rooms, one or more lawn height detectors, one or more nitrogen level sensors, one or more phosphate level sensors, one or more potassium level sensors, one or more leaf color detectors, one or more wind sensors, one or more snow accumulation sensors, one or more indoor solar light sensors, one or more outdoor solar light sensors, one or more weather station sensors (e.g., one or more neighborhood weather station sensors, one or more regional weather station sensors, one or more national weather station sensors, one or more global weather station sensors, etc.), one or more motion detectors detecting proximity of people or animals, one or more particulate sensors (e.g., one or more optical particulate sensors, one or more electrostatic particulate sensors, etc.), one or more object position sensors, one or more flame detectors, one or more sound amplitude sensors, one or more sound propagation detectors, one or more frequency sensors, and/or the like.

According to some embodiments, the IoT-capable sensors 115 might also include, but are not limited to, at least one of one or more proximity sensors (e.g., vehicle camera-based collision avoidance system, the vehicle radar-based proximity detection system, the vehicle lidar-based proximity detection system, the vehicle sonar-based proximity detection system, etc.), one or more speed sensors, one or more fuel level sensors (e.g., gasoline tank level sensors, diesel tank level sensors, battery charge level sensors, etc.), one or more brake sensors, one or more fluid leak detectors, one or more tire pressure sensors, an engine temperature sensor, one or more fluid leak detectors, one or more occupant sensors, one or more impact sensors, one or more stress sensors, or one or more suspension system diagnostic sensors, and/or the like. In some instances, the IoT-capable sensors 115 might further include, without limitation, one or more structural integrity sensors (e.g., for roadways, pathways, buildings, airport terminal buildings, airport hangars and service buildings, railway facilities, railway tracks, marine ports, public transit structures, utility structures, monuments and/or art pieces, bridges, tunnels, etc.), one or more pressure sensors, and/or the like.

In some cases, the devices 120—which might be IoT-capable or might simply be controllable by an IoT-capable device 110 (or by the computing system 105), and might, for purposes of description herein, be a device that does not have any IoT-capable sensors 115 disposed therein or thereon—might include, without limitation, at least one of one or more display devices, one or more traffic control signal devices, one or more street lamps, one or more emergency exit markers, one or more building lights, one or more building furnaces, one or more building air conditioner, one or more building ventilation fans, one or more sprinkler systems, one or more wireless electrical outlets, and/or the like.

In some embodiments, the utility computing system(s) 155 might include, but is not limited to, at least one of a remote IoT management node, a server computer, a cloud computing system, and/or the like, each of which may be located outside of (or remote from) the customer premises/vehicle/roadway/portion of the population area in which the one or more of the at least one IoT-capable device 110, the at least one IoT-capable sensor 115, or the at least one device 120 are disposed. In addition, the utility computing system 155 might be remote from a PSAP and/or incorporated within a PSAP. Based on instructions received from the PSAP computing system 105, the utility computing system 155 might be configured to control the local computing system(s) 125, the IoT-capable devices 110, the IoT-capable sensors 115, the devices 120, and/or the like, via the one or more networks 130, and in some cases, via the one or more telecommunications relay systems 135. In a non-limiting example, the utility computing system 155 might be configured to control one or more utility devices (including, without limitation, one or more electric utility devices, one or more gas utility devices, or one or more water utility devices, and/or the like) located at a customer premises, along a roadway, and/or in a population area.

The machine-to-machine communications between the computing system 105 and each of the IoT-capable devices 110a-110n, between the computing system 105 and each of the IoT-capable sensors 115a-115n, between the computing system 105 and each of the devices 120a-120n, between the computing system 105 and each of the one or more local computing systems 125, between the computing system 105 and the utility control system 155, between each of the IoT-capable devices 110a-110n and another of the IoT-capable devices 110a-110n, between each of the IoT-capable devices 110a-110n and one or more IoT-capable sensors 115 in another of the IoT-capable devices 110a-110n, between each of the IoT-capable devices 110a-110n and the utility control system 155, and so on are represented in FIG. 1 by the lightning bolt symbols, which in some cases denote wireless communications (although, in some instances, need not be wireless, but can be wired communications). Herein, "machine-to-machine communications" refers to communications between or among machines or devices that are not initiated by or instructed by a human. Machine-to-machine communications may be initiated autonomously by one of the machines based on triggers (e.g., conditions being met;

particular sensor data being received, observed, recorded, etc.; sensor data exceeding predetermined threshold levels for particular types of sensors; and/or the like). In some instances, each IoT-capable device of the plurality of IoT-capable devices 110a-110n, each IoT-capable sensor of the plurality of IoT-capable sensors 115a-115n, and, in some cases, each device of the plurality of devices 120a-120n as well, might be assigned a unique IPv6 identifier(s) or the like that enables secure and non-confused communications with particular IoT-capable devices or sensors (as no two devices or sensors will have the same identifier, although some devices may be collocated and unique identifiers may exist for various layers of the protocol stack, or the like). In some cases, the IPv6 identifiers may be used together with other identifiers for the same device. In some instances, such identification capability can simplify device registration and/or can be used to facilitate machine-to-machine communications, machine-to-network communications, and/or the like.

In some instances, the network(s) 130 might each include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, and/or any other wireless protocol, and/or any combination of these and/or other networks. In a particular embodiment, the network(s) 130 might include an access network of the service provider (e.g., an Internet service provider ("ISP")), or the like. The one or more telecommunications relay systems 135 might include, without limitation, one or more wireless network interfaces (e.g., wireless modems, wireless access points, and the like), one or more towers, one or more satellites, and/or the like.

In some embodiments, the system 100 might further comprise a data store or data lake 140, which may be located at the PSAP and/or remote from the PSAP, that stores information regarding the one or more PSAP computing systems 105, information regarding the IoT-capable devices 110, information regarding the IoT-capable sensors 115, information regarding the devices 120, information regarding local computing system(s) 125, information regarding communications amongst these devices and sensors, information regarding communications between each user of the various devices and the computing system(s) 105 or any of the IoT-capable devices and sensors, information regarding the network(s) 130, information regarding communications between the computing system(s) 105 and each of the IoT-capable devices 110, the IoT-capable sensors 115, and the devices 120, and/or the like. In some cases, the system 100 might further comprise an analytics engine 145 and an associated database(s) 150 that together analyze and track (or record) communications amongst the various components of system 100 (i.e., the one or more computing systems 105 located at the PSAP, the IoT-capable devices 110, the IoT-capable sensors 115, the devices 120, the local computing system(s) 125, and/or the like) to identify trends as well as to identify potential issues with communications or efficiency of the system, and/or the like, the results of which might cause the one or more computing systems 105 to send software updates to affected or applicable ones of the IoT-capable devices 110, the IoT-capable sensors 115, the devices 120, and/or the like.

Figure 2:
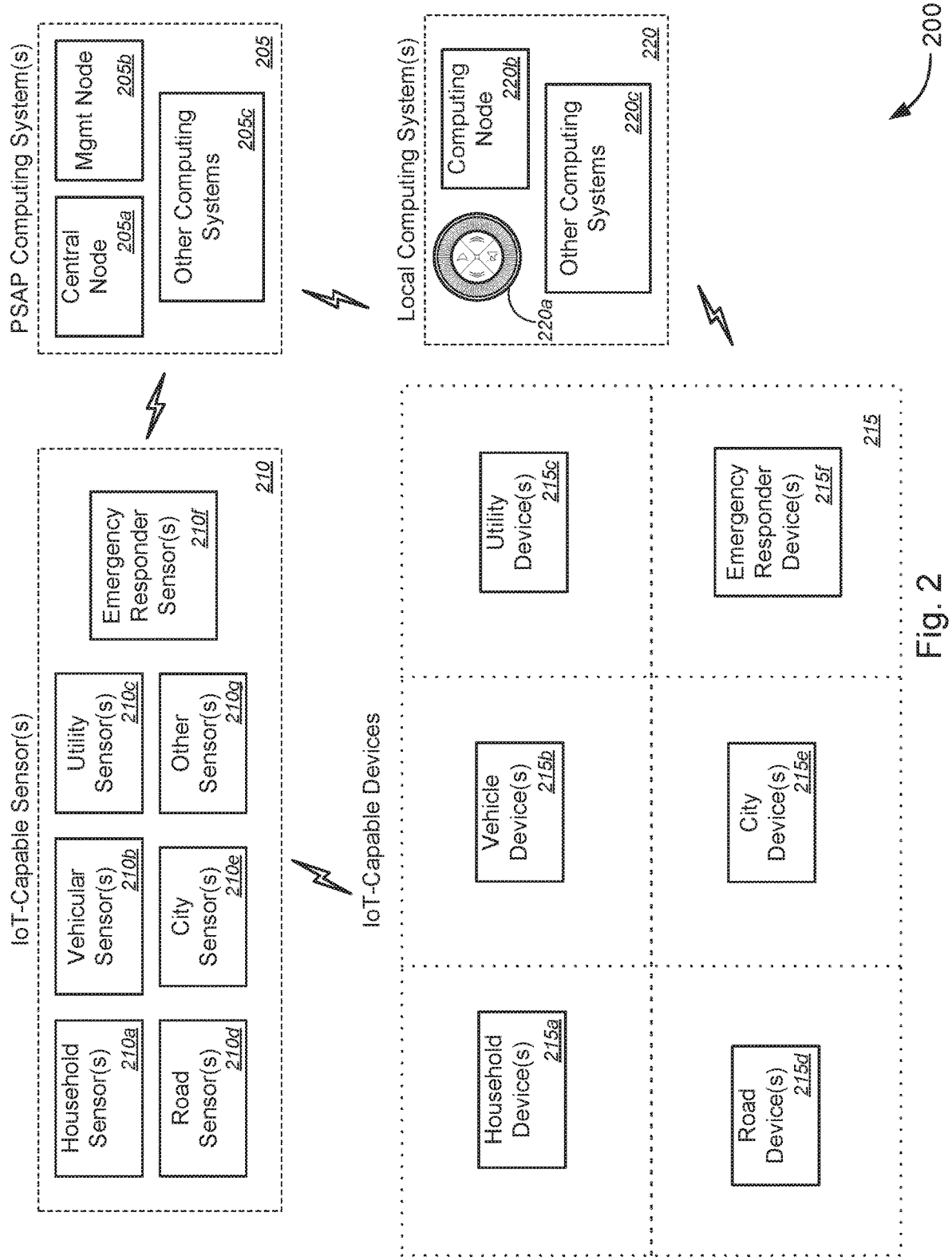
FIG. 2 is a schematic diagram illustrating a system for implementing IoT-based smart home, building, or customer premises functionality, smart vehicle functionality, smart utility functionality, smart roadway functionality, smart city functionality, and/or the like, with a PSAP, in accordance with various embodiments.

FIG. 2 is a schematic diagram illustrating a system 200 for implementing IoT-based smart home, building, or customer premises functionality, smart vehicle functionality, smart utility functionality, smart roadway functionality, smart city functionality, and/or the like, with a PSAP, in accordance with various embodiments In FIG. 2, system 200 might comprise one or more PSAP computing systems 205 located at a PSAP, one or more IoT-capable sensors 210, one or more IoT-capable devices 215, and one or more local computing systems 220, each of which might communicate with each other via machine-to-machine communications (not unlike the machine-to-machine communications as described above with respect to FIG. 1). Inter-device communications may be restricted by design, by different vendor manufacturers, or by other logic, and the like.

The PSAP computing system 205 might include, without limitation, at least one of a central node 205a (or a single processor or a plurality of processors disposed therein, where such processor or processors may be physical or virtual in nature) located at a PSAP, a management node 205b that may be located within at least a portion of a population area, a roadway, and/or the like, and/or other computing systems 205c, which might include, but are not limited to, an IoT management node (that may be located at a service provider facility associated with a service provider that provides services to at least portions of the population area), an IoT management node located at a customer premises, one or more roadway-embedded IoT management nodes, one or more municipal, state, federal, or private entity IoT management nodes, a computing system disposed at a vehicle traffic control center, a server computer that serves the population area, a server computer that is remote from the population area, a cloud computing system, a distributed computing system that integrates computing resources from two or more IoT-capable devices, or a combination of two or more of these computing systems, and/or the like The local computing system 220 may include at least one of an IoT human interface device 220a (or a single processor or a plurality of processors disposed therein, where such processor or processors may be physical or virtual in nature), a computing node 220b that may be located within a customer premises, or other computing systems 220c, which might include, but are not limited to, an IoT management node, or the like.

According to some embodiments, the IoT-capable sensors 210 might include, without limitation, one or more household sensors 210a, one or more vehicular sensors 210b, one or more utility sensors 210c, one or more road sensor(s) 210d, one or more city sensor(s) 210e, one or more sensors associated with one or more emergency responders 210f, one or more other sensor(s) 210g, and/or the like.

The one or more household sensor(s) 210a might include at least one of one or more temperature sensors (e.g., heat sensors, infrared sensors, thermometers, etc.), one or more light sensors (e.g., ambient light sensors, luminosity sensors, illuminance sensors, solar light sensors, etc.), one or more humidity sensors, one or more motion sensors, one or more cameras, one or more biometric sensors, one or more health sensors (e.g., fitness tracker, heart rate sensor, etc.), one or more location sensors (e.g., global positioning system ("GPS") devices, global navigation satellite system ("GNSS") devices, other location sensors, etc.), one or more air quality sensors, one or more carbon monoxide sensors, one or more smoke detectors, one or more gas detectors, one or more water leak detectors, one or more contact sensors, one or more audio sensors, one or more accelerometers, one or more proximity sensors, one or more radiation sensors, one or more telecommunications signal sensors, and/or the like. In some embodiments, the household IoT-capable sensors 210a might further include, without limitation, one or more thermometers in one or more rooms of the customer premises, one or more infrared ("IR") thermometers aimed at one or more positions in the one or more rooms, one or more air flow sensors in the one or more rooms, one or more air flow sensors in air ducts directed toward the one or more rooms, one or more indoor solar light sensors, one or more outdoor solar light sensors, one or more outdoor wind sensors, one or more neighborhood weather station sensors, one or more regional weather station sensors, one or more motion detectors detecting presence of people or animals in at least one of the one or more rooms or outside the customer premises, one or more humidity sensors in the one or more rooms, one or more smoke detectors detecting smoke in the one or more rooms, one or more gas detection sensors detecting gas in the one or more rooms, one or more biometric sensors identifying at least one person, or one or more health sensors detecting health information for at least one person, and/or the like.

The one or more vehicle sensors 210b might be associated with at least one of one or more vehicles associated with a customer premises, one or more vehicles associated with an emergency responder, one or more vehicles located on a roadway between one or more emergency response vehicles and a customer premises, and/or the like. The one or more vehicle sensors 210b might include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more proximity sensors (e.g., vehicle camera-based collision avoidance system, the vehicle radar-based proximity detection system, the vehicle lidar-based proximity detection system, the vehicle sonar-based proximity detection system, etc.), one or more speed sensors, one or more cameras, one or more fuel level sensors (e.g., gasoline tank level sensors, diesel tank level sensors, battery charge level sensors, etc.), one or more location sensors (e.g., global positioning system ("GPS") devices, global navigation satellite system ("GNSS") devices, other location sensors, etc.), one or more brake sensors, one or more air quality sensors, one or more carbon monoxide sensors, one or more smoke detectors, one or more fluid leak detectors, one or more contact sensors (e.g., for the door lock system, the hood ajar detector, the trunk ajar detector, the moon/sky light ajar detector, the window open detector, and/or the like), one or more audio sensors, one or more accelerometers, one or more telecommunications signal sensors, one or more tire pressure sensors, an engine temperature sensor, one or more fluid leak detectors, one or more occupant sensors, one or more impact sensors, one or more stress sensors, or one or more suspension system diagnostic sensors, and/or the like.

The one or more utility sensors 210c may include, without limitation, one or more gas detection sensors, one or more water detection sensors, one or more gas flow rate sensors, one or more water flow rate sensors, and/or the like.

The one or more road sensor(s) 210d might include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more humidity sensors, one or more motion sensors, one or more structural integrity sensors, one or more pressure sensors, one or more air quality sensors, one or more communications signal detectors, one or more seismic sensors, one or more weather station sensors, one or more moisture sensors, one or more wind sensors, one or more particulate sensors, one or more impact sensors, one or more stress sensors, or one or more location sensors, and/or the like.

The one or more city sensors 210e may include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more weather sensors, one or more motion sensors, one or more structural integrity sensors, one or more pressure sensors, one or more air quality sensors, one or more communications signal detectors, one or more seismic sensors, one or more weather station sensors, one or more moisture sensors, one or more humidity sensors, one or more wind sensors, one or more particulate sensors, one or more impact sensors, or one or more location sensors, and/or the like. In some instances, the one or more city IoT-capable sensors 210e might further comprise IoT-capable sensors in each of one or more vehicles travelling on the roadway. In some cases, the one or more structural integrity sensors might include, without limitation, at least one of two or more global positioning system sensors or two or more relative position sensors that are embedded in or disposed on one or more exterior surfaces of at least one of portions of one or more roadways (including, but not limited to, at least one of a local road, a main road, a highway, an airport apron, an airport ramp, an airport runway, a canal, a lock, or a waterway, and/or the like), portions of one or more public pathways (e.g., sidewalks, trails, public moving pathways, public escalators, public elevators, etc.), portions of one or more buildings (e.g., government buildings, other public buildings, etc.), portions of one or more public centers, portions of one or more airport terminal buildings, portions of one or more airport hangars and service buildings, portions of one or more railway facilities, portions of one or more railway tracks, portions of one or more marine ports, portions of one or more public transit structures, portions of one or more utility structures, portions of one or more public monuments or public art pieces, bridges, tunnels, and/or the like, where the sensor data from these sensors might comprise data indicating a change in position of one structural integrity sensor relative to another structural integrity sensor beyond a predetermined threshold amount, thereby indicating that there might be damage to corresponding at least one of one or more roadways, one or more public pathways, one or more buildings, one or more public centers, one or more airport terminal buildings, one or more airport hangars and service buildings, one or more railway facilities, one or more railway tracks, one or more marine ports, one or more public transit structures, one or more utility structures, one or more public monuments or public art pieces, bridges, tunnels, and/or the like.

The one or more emergency responder sensor(s) 210f may be associated with one or more emergency responders responding to an emergency situation. The one or more emergency responder sensor(s) 210f, may include, without limitation, one or more biometric sensors (e.g., fingerprint sensors, palm print sensors, footprint sensors, handprint sensors, voice identification sensors, iris scanners, retina scanners, etc.), one or more health sensors (e.g., heart rate monitors, respiratory monitors, etc.) one or more locations sensors (e.g., global positioning system ("GPS") devices, global navigation satellite system ("GNSS") devices, other location sensors, etc.), and/or the like.

In some embodiments, the household IoT-capable devices 215a might include one or more household IoT-capable sensors 210a and/or might further include, without limitation, a desktop computer, a laptop computer, a tablet computer, a smart phone, a mobile phone, a portable gaming device, a database or data storage device, a network access point ("NAP"), a television or monitor, a set-top box ("STB"), a gaming console, an image capture device, a video capture device, a time piece (including, without limitation, a clock, a watch, or other time piece, and the like), a thermostat or environmental control system, a kitchen appliance (including, but not limited to, a microwave oven, a refrigerator, an oven, a range, a stove, an induction cooktop, a pressure cooker, a rice cooker, a bread maker, a coffee machine, a kettle, a dishwasher, a food thermometer, and/or the like), a medical device, a telephone system, a speaker, a media recording and/or playback device, a lighting system, a customer premises security control system, one or more dedicated remote control devices, one or more universal remote control devices, a personal digital assistant, a fitness tracking device, a printer, a scanner, an image projection device, a video projection device, a household appliance, a vehicle, an audio headset, earbuds, virtual reality goggles or headset, augmented reality goggles or headset, a door unlocking/locking system, an automated door opening/closing system, a window locking system, an automated window opening or closing system, an automated window covering control system, a smart window, a solar cell or solar cell array, an electrical outlet or smart node, a power strip or bar, a dimmer switch, a data port, a sprinkler system, exercise equipment, and/or the like. The IoT-capable devices or household devices 215a might further include, but are not limited to, one or more of a furnace, an air conditioner, one or more automated skylight opening or closing systems, one or more humidifiers, one or more dehumidifiers one or more ventilation fans, one or more automated lawn mowers, one or more automated trimmers, one or more sprinkler systems, one or more fertilizer dispensers, one or more animal deterrent systems, one or more automated snow shovels, one or more automated snow blowers, one or more animal deterrent systems, one or more speakers warning people about machinery in use, one or more lights or display devices warning people about machinery in use, one or more de-icing machines, one or more heating mats, one or more built-in radiant heat systems under the at least one pathway, one or more air purifiers, one or more air filters, one or more electrostatic particulate collecting tools, a washing machine, a clothes dryer, a fire suppression system, one or more emergency exit markers, one or more exit route markers, one or more lights (e.g., LEDs, indicator lights, warning lights, etc.), one or more fire suppression drones, one or more white noise generators, and/or the like.

The one or more vehicular devices 215b might be associated with at least one of one or more vehicles associated with a customer premises, one or more vehicles associated with an emergency responder, one or more vehicles located on a roadway between one or more emergency response vehicles and a customer premises, and/or the like. The one or more vehicular devices 215b might include, but are not limited to, one or more IoT-capable sensors 210b and/or might further include, without limitation, a vehicle computer, a vehicle engine, an electronic throttle control ("ETC") system, a vehicle brake system, a vehicle steering system, a vehicle head light system, a vehicle turn signal light system, a vehicle brake light system, a vehicle (analog or digital) instrument gauge cluster, a vehicle heads-up-display ("HUD") system, a vehicle-based transceiver or communications system, a navigation system, a vehicle display device, a vehicle speaker system, a vehicle (self-) diagnostic system, a vehicle hazard light system, a vehicle gear system, a door unlocking/locking system, an automated door opening/closing system, an automated window opening or closing system, an automated vehicle window covering control system, a data port, one or more vehicle climate control systems, one or more air purifiers, one or more air filters, one or more electrostatic particulate collecting tools, a fire suppression system, one or more lights (e.g., reading lights, LEDs, indicator lights, warning lights, etc.), or a vehicle-based wireless access point ("WAP"), and/or the like.

The one or more utility devices 215c, might include, but are not limited to, one or more IoT-capable sensors 210c and/or might further include, without limitation, one or more electric utility devices, one or more gas utility devices, or one or more water utility devices, and/or the like.

The one or more road device(s) 215d, might include, but are not limited to, one or more IoT-capable sensors 210d and/or might further include, without limitation, one or more power generation nodes, one or more battery charging nodes, one or more communications systems, one or more traffic control signal devices, one or more street lamps, one or more dynamic lane change markers, one or more vehicular components in each of one or more vehicles travelling on the roadway (including, but not limited to, a vehicle computer, a vehicle engine, an electronic throttle control ("ETC") system, a vehicle brake system, a vehicle steering system, a vehicle light system, a vehicle (analog or digital) instrument gauge cluster, a navigation system, a vehicle (self-) diagnostic system, a vehicle-based transceiver or communications system, and/or the like), a vehicle gear system, one or more air purifiers, one or more air filters, one or more electrostatic particulate collecting tools, a fire suppression system, one or more lights (e.g., LEDs, indicator lights, warning lights, etc.), or a wireless access point ("WAP"), and/or the like.

In some embodiments, the city IoT-capable devices 215e might include one or more city IoT-capable sensors 210e and/or might further include, without limitation, one or more power generation nodes, one or more battery charging nodes, one or more communications systems, one or more traffic control signal devices, one or more street lamps, one or more dynamic lane change markers, one or more vehicle systems or vehicular components in each of one or more vehicles travelling on the roadway (including, but not limited to, a vehicle computer, a vehicle engine, an electronic throttle control ("ETC") system, a vehicle brake system, a vehicle gear system, a vehicle steering system, a vehicle light system, a vehicle (analog or digital) instrument gauge cluster, a navigation system, a vehicle (self-) diagnostic system, a vehicle-based transceiver or communications system, and/or the like), one or more public transit vehicle systems in each of one or more public transit vehicles travelling on the roadway, waterway, and/or railway (including, but not limited to, a vehicle computer, a vehicle engine, an electronic throttle control ("ETC") system, a vehicle brake system, a vehicle gear system, a vehicle steering system, a vehicle light system, a vehicle (analog or digital) instrument gauge cluster, a navigation system, a vehicle (self-) diagnostic system, a vehicle-based transceiver or communications system, and/or the like), one or more public display devices (e.g., electronic billboards, digital public signs, public televisions, public monitors, public touch-screen interface displays, public directories, and/or the like), one or more power distribution systems, one or more railway systems (including, without limitation, train control systems, railway switch controls, railway crossing controls, rail track power systems, rail track maintenance systems such as rail lubrication systems and switch heaters, track diagnostic systems, railway signal diagnostic systems, and/or the like), one or more user devices associated with users who are currently located in the population area, one or more cleaning systems, one or more grounds-keeping systems, one or more emergency (response) systems, one or more transceivers, a wireless access point ("WAP"), a door unlocking/locking system installed in one or more public buildings or facilities, an automated door opening/closing system installed in one or more public buildings or facilities, an automated window opening or closing system installed in one or more public buildings or facilities, an automated window covering control system installed in one or more public buildings or facilities, a data port, one or more building climate control systems, one or more public transport climate control systems, one or more air purifiers, one or more air filters, one or more electrostatic particulate collecting tools, a fire suppression system, or one or more lights (e.g., reading lights, LEDs, indicator lights, warning lights, etc.), and/or the like.

In some cases, the emergency responder device(s), might include, without limitation, a desktop computer, a laptop computer, a tablet computer, a smart phone, a mobile phone, one or more personal digital assistants, one or more global positioning systems, or one or more drones, and/or the like.

The one or more PSAP computing systems 205, the IoT-capable sensors 210, the IoT-capable devices/household devices 215, and the one or more local computing systems 220, are otherwise similar, if not identical, to the one or more PSAP computing systems 105, the IoT-capable sensors 115, the IoT-capable devices 110 or devices 120, and the local computing system 125, respectively, as described above with respect to FIG. 1.

Figure 3:
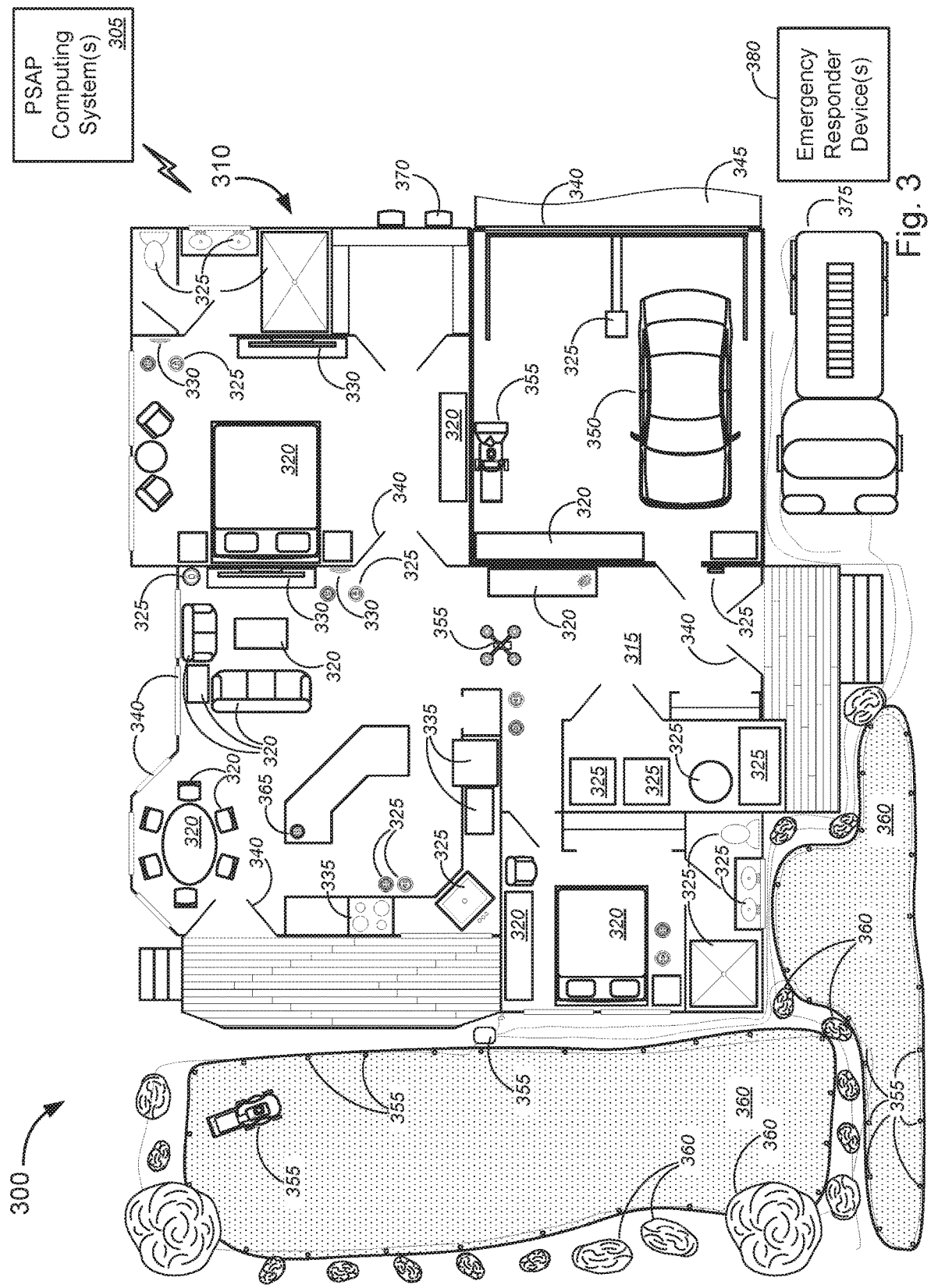
FIG. 3 is a schematic diagram illustrating a system for implementing IoT-based smart home, building, or customer premises functionality, smart vehicle functionality, smart utility functionality, and/or the like, with a PSAP, in accordance with various embodiments.

FIG. 3 is a schematic diagram illustrating a system 300 for implementing IoT-based smart home, building, or customer premises functionality, smart vehicle functionality, smart utility functionality, and/or the like, with a PSAP computing system 305, in accordance with various embodiments.

A system 300 might comprise a PSAP computing system 305 and customer premises 310. PSAP computing system 305 might be configured to communicate with one or more smart functionality devices located at customer premises 310.

Customer premises 310 (although shown in FIG. 3 as a ranch-style residential home) might comprise a home, building, or other customer premises structure (e.g., business premises, commercial office, school, industrial building, etc.). Customer premises structure 315 might comprise one or more pieces of furniture 320 (including, but not limited to, dining tables, dining chairs, couches or sofas, side tables, coffee tables, entertainment stands, beds, seats, dressers, cabinets, shelves, stools, etc.), home appliances or fixtures 325 (including, without limitation, kitchen sinks, bathroom sinks, toilets, shower enclosures, bathtubs, smoke detectors, CO monitors, home/business/premises security systems, thermostat, mirrors, lights, furnace, air conditioner, water heater, washer, dryer, garage door opener, a pool(s), a gazebo or pergola, etc.), user or electronic devices 330 (including, but not limited to, televisions, smart phones, mobile phones, tablet computers, desktop computers, set-top boxes ("STBs"), gaming devices or consoles, virtual reality goggles, augmented reality goggles, fitness trackers, smart watches, clocks, etc.), kitchen appliances 335 (including, without limitation, electric stoves, induction stoves, gas stoves, refrigerators, freezers, microwave ovens, electric ovens, convectional ovens, gas ovens, rice cookers, steamers, coffee machines, tea machines, toasters, toaster ovens, mixers, and/or the like), doorways and windows 340 (e.g., front door(s), patio door(s), room doors, closet doors, bathroom doors, garage doors, windows, etc.), pathways 345 (e.g., driveways, walkways, sidewalks, patio, steps, porch, garden paths, etc.), vehicles 350, grounds-keeping equipment 355 (e.g., sprinkler system (including, without limitation, sprinkler heads, sprinkler lines, sprinkler switches, sprinkler controllers, lawn mower, snow blower, fertilizer distributors, grounds-keeping drones, fire-suppression drones, and/or the like), lawn and plant life 360 (including, but not limited to, lawn, trees, bushes, shrubs, flowers, plants, and/or the like that may be planted indoors or outdoors), control or management nodes 365 (including, without limitation, IoT human interface devices, computing nodes, management nodes, gateway devices, etc.), and/or the like. Additionally, one or more utility devices 370, one or more emergency response vehicles 375 (e.g., police cars, fire trucks, ambulances, and/or the like), and/or emergency response devices 380 (including, but not limited to, televisions, smart phones, mobile phones, tablet computers, desktop computers, set-top boxes ("STBs"), gaming devices or consoles, virtual reality goggles, augmented reality goggles, etc.) may be located at customer premises 310.

In some embodiments, the PSAP computing system 305 may interact in a machine-to-machine manner with and/or to control each of at least one of one or more home appliances or fixtures 325, one or more user or electronic devices 330, one or more kitchen appliances 335, one or more doorways and windows 340, one or more vehicles 350, one or more grounds-keeping equipment 355, one or more control/management nodes 365, one or more emergency response vehicles 375, emergency response devices 380, and/or the like. One or more IoT-capable sensors might be embodied within one or more of these devices or systems or embodied in stand-alone housings.

Additionally and/or alternatively, the PSAP computing system 305 may interact in a machine-to-machine manner with control or management nodes 365 and the control or management nodes might interact in a machine-to-machine manner with each of, or to control, at least one of one or more home appliances or fixtures 325, one or more user or electronic devices 330, one or more kitchen appliances 335, one or more doorways and windows 340, one or more vehicles 350, one or more grounds-keeping equipment 355, one or more control/management nodes 365, one or more emergency response vehicles 375, emergency response devices 380, and/or the like.

The following is an example of system 300 being used in response to a fire occurring at the customer premises 310. Although a fire is being used as an example, PSAP computing system 305 might control different devices/sensors based on different emergency situations. These emergency situations might include, without limitation, at least one of an earthquake, a flood, a personal injury, a medical situation, a burglary, an intruder in a customer premises 310, and/or the like.

For example, in the case of a fire at customer premises 310, the PSAP computing system 305 might receive at least one first message (e.g., a voice message, text message, video message, etc.) indicative of an emergency situation occurring at a customer premises 310. The emergency message might be sent by a user utilizing one or more user or electronic devices 330. Additionally and/or alternatively, the emergency message indicative of an emergency situation might be sent by a device with one or more IoT-capable sensors (e.g., one or more smoke detectors configured to detect smoke, one or more gas detectors configured to detect gas, etc.). The devices with the one or more IoT-capable sensors may be communicatively coupled to the PSAP computing system 305 via one or more networks, via control or management nodes 365, and/or the like.

PSAP computing system 305 may then analyze the first message indicative of an emergency to determine one or more first actions to be taken in response to the emergency situation. In this case, PSAP computing system 305 may analyze the first message and may detect one or more key words associated with the emergency (e.g., smoke, fire, etc.). Alternatively, if the smoke detector sent an indication that it detected smoke, the PSAP computing system 305 might determine that there is a fire. Based on a determination that a fire is occurring at customer premises 310, PSAP computing system 305 may then determine one or more actions to take to address the fire.

In various embodiments, the PSAP computing system 305 might identify one or more devices to address the fire at customer premises 305. For example, PSAP computing system 305 might identify at least one of one or more household devices associated with the customer premises (e.g., one or more sprinkler systems, one or more fire suppressant drones, one or more biometric sensors or health sensors associated with users located at the customer premises, one or more automated door locks, windows, garages, or one or more lights, and/or the like), one or more first vehicular components associated with a vehicle known to be associated with a resident of the customer premises (e.g., one or more automated driving systems, and/or the like), one or more utility devices associated with a utility service provider supplying at least one of electrical power, gas, or water to the customer premises (e.g., one or more water valves or pipes, one or more gas valves or pipes, and/or the like), one or more second vehicular components associated with each of one or more emergency response vehicles (e.g., one or more automated driving systems, one or more global positioning systems, and/or the like), or one or more emergency response devices associated with one or more emergency responders for performing the determined one or more first actions to be taken (e.g., one or more global positioning systems, one or more mobile phones, one or more tablets, and/or the like).

Additionally, the PSAP computing system 305 might determine an identity of one or more emergency responders on duty, an expertise (e.g., medical expertise, firefighting expertise, and/or the like) of one or more emergency responders, one or more tools (e.g., fire protection suit, hammer, axe, medical equipment, etc.) associated with one or more emergency responders responding to the emergency, and/or the like. The PSAP computing system 305 might also identify one or more devices that the PSAP cannot control (e.g., one or more utility devices, household devices, etc.). This information may be stored in a database accessible by the PSAP computing system 305. Each emergency responder may have a profile that indicates his or her expertise, when he or she is on duty, the tools he or she typically bring to address an emergency situation, and/or the like.

Based on the identification of one or more devices needed to address the fire at customer premises 305 and/or the one or more tools associated with the one or more emergency responders, the PSAP computing system 305 might develop a map of the customer premises and/or a list of tasks for each emergency responder to perform.

In a non-limiting example, the PSAP computing system 305 might determine which smoke detector detected smoke first and determine that the fire most likely originated in the room containing the smoke detector that first detected smoke. The PSAP computing system 305 might mark this location on a map of the customer premises 310. Additionally and/or alternatively, PSAP computing system 305 might determine a location of one or more user devices 330 (e.g., one or more mobile phones, fitness trackers, smart watches, etc.) associated with one or more users located within or associated with customer premises 310. Based on the determination of the location of one or more devices 330 associated with a user, the PSAP computing system 305 might determine that these are the most likely locations of the user within customer premises 310. The PSAP computing system 305 might mark these locations on the map of the customer premises as the most likely location of the user. Thus, users may more easily be found in customer premises 305 by emergency responders. The PSAP computing system 305 may also include, without limitation, a location of one or more utilities, a location of one or more electrical lines, a location of one or more water pipes, a location of one or more sprinklers, a location of one or more gas pipes, a location of one or more on/off switches for electricity, water, and/or gas, and/or the like on the map of the customer premises 310. Additionally and/or alternatively, the PSAP computing system 305 might mark the location of devices the PSAP computing system 305 can and/or cannot control. For example, the PSAP computing system 305 may mark the location of one or more water intake valves that are located at the customer premises and controlled by a water utility or one or more gas valves that are located at the customer premises and controlled by a gas utility.

The PSAP computing system 305 might then send the map of the customer premises 310 with key locations marked to one or more emergency responder devices 380. Different maps may be sent to different emergency responders to address different situations. In a non-limiting example, a map with the location of where the fire first started may be sent to one or more firefighters while a map with locations of one or more users may be sent to firefighters, police officers, and/or medical responders.

In a non-limiting example, the list of tasks for each emergency responder may be sent to each emergency responder based on his or her expertise and/or tools. For example, one or more emergency responders may have specific tools to turn off the gas to a customer premises 310, while others may have an axe to break open a door or window of the customer premises. The list of tasks may have a specific order of events that must be followed in order to address the emergency situation. For example, in the case of a fire, the gas may have to be shutoff before firefighters can begin fighting the fire.

Additionally and/or alternatively, the PSAP computing system 305 may autonomously control at least one of the identified one or more devices to address the fire. For example, one or more sprinkler systems may be turned off or on, one or more fire suppressant drones might be sent to fight the fire where it most likely started, one or more biometric sensors or health sensors associated with users located at the customer premises might be used to determine where one or more users are located within the customer premises and the health of one or more users within the premises, one or more automated door locks, windows, or garages may be opened to allow emergency responders to enter the customer premises 310. Further, one or more first vehicular components associated with a vehicle known to be associated with a resident of the customer premises might be controlled to move the vehicle out of the way of emergency responders. One or more utility devices associated with a utility service provider supplying at least one of electrical power, gas, or water to the customer premises might be controlled to turn water, gas, or electricity to a customer premises on or off, to reroute the flow of water, gas, or electricity through the customer premises, or to adjust the flow amount of water, gas, or electricity through the customer premises, or the like. One or more second vehicular components associated with each of one or more emergency response vehicles might be controlled to drive the emergency response vehicles to the location of the fire and spray water in the direction of the fire.

In order to autonomously control the identified one or more devices, at least one of an operator at the PSAP, a customer, a utility provider, an emergency responder, and/or the like may have to give permission to the PSAP to control the one or more devices. In order to obtain permission, the PSAP computing system 305 might develop a list of devices that it identified to address the emergency situation. A PSAP operator, user, utility provider, and/or the like may review the list and then grant the PSAP computing system 305 the ability to control the one or more identified devices. The PSAP computing system 305 might be granted access to control all of the identified devices, some of the identified devices, or none of the identified devices.

In some cases, the PSAP computing system 305 might not be given permission to control at least some of the one or more identified devices until emergency responders arrive at the customer premises 310. For example, the PSAP computing system might track a location of one or more emergency response vehicles 375 and/or one or more emergency responder devices 380 to determine when emergency responders arrive at the location of the customer premises. Once emergency responders arrive, the PSAP computing system 305 may control some or all of the identified devices to address the emergency situation. Additionally and/or alternatively, the PSAP computing system 305 may wait until it receives confirmation from one or more users via a user device, a PSAP operator via computing system 305, one or more emergency responders via emergency responder devices 380, and/or the like that there is an emergency situation occurring at customer premises 310 before PSAP computing system 305 controls at least some of the one or more identified devices.

In a non-limiting example, based on a determination that there is a fire at the customer premises 310, PSAP computing system 305 might automatically turn off the gas to the customer premises, turn on one or more sprinklers, and/or the like. However, the PSAP computing system 305 might wait to unlock one or more doors, windows, or garages until one or more emergency responders arrive at customer premises 310.

Additionally and/or alternatively, the PSAP computing system 305 may give one or more emergency responder devices 380 the ability to control some or all of the identified one or more household devices, the identified one or more first vehicular components, the identified one or more utility devices, the identified one or more second vehicular components, and/or the like. The PSAP computing system 305 might send at least one of a key or a passcode to the one or more emergency response devices 380. The at least one of the key or the passcode may allow the one or more emergency response devices 380 to control at least one of the identified one or more household devices, the identified one or more first vehicular components, or the identified one or more utility devices, and/or the like. The key or passcode may be generated by the PSAP computing system 305 and/or provided by a user or utility provider. The emergency responder devices 380 may control the one or more identified devices in a similar manner as PSAP computing system 305 described above.

In some embodiments, the PSAP computing system 305 may additionally track and identify emergency responders entering and exiting customer premises 310. In order to do this, PSAP computing system may track one or more emergency responder devices 380, may use one or more cameras located at customer premises 310 and facial recognition tools to determine emergency responders entering and exiting customer premises 310, and/or the like. Additionally and/or alternatively, only those emergency responders with the key or passcode may be allowed to enter the customer premises 310. This helps ensure no unauthorized personnel enter the customer premises 310.

These are just some examples of the devices the PSAP computing system 305 might control and the functions the PSAP computing system 305 might perform to address the fire occurring at customer premises 310.

Although the example of the fire was used as an example of the emergency situation indicated in the first message, similar methods may be used to address other emergency situations, such as, but not limited to, flooding, earthquakes, personal injuries in a house, medical injuries or complications, gas leaks, burglaries, intruders in a house, and/or the like. Additionally, although an emergency at the customer premises 310 was described, similar methods might be used to address emergencies outside of the customer premises (e.g., accidents on the road, lost hikers, sailing accidents, and/or the like).

Figure 4:
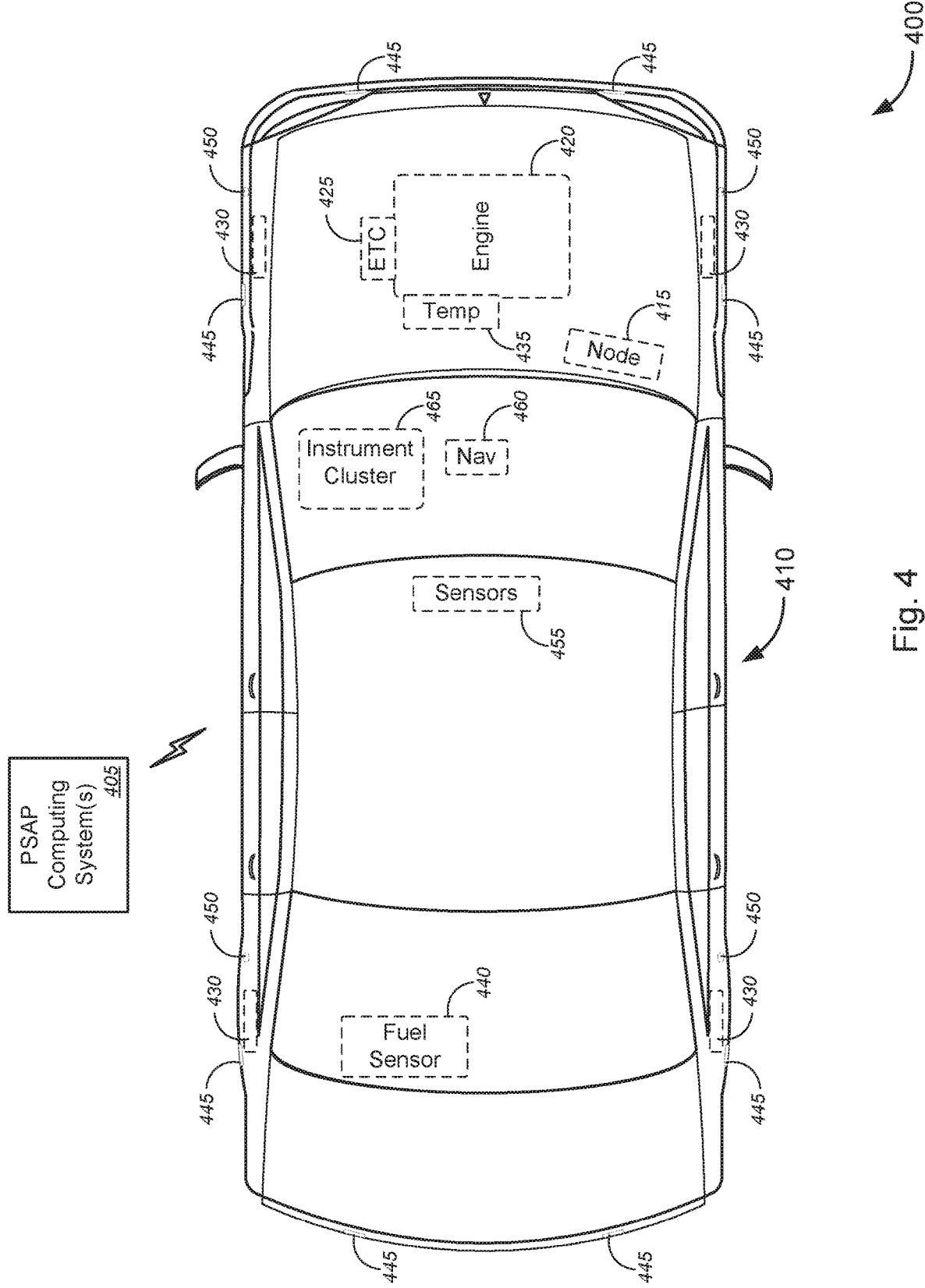
FIG. 4 is a schematic diagram illustrating a system for implementing IoT-based smart vehicle functionality with a PSAP, in accordance with various embodiments.

FIG. 4 is a schematic diagram illustrating a system 400 for implementing IoT-based smart vehicle functionality, with a PSAP computing system 405, in accordance with various embodiments.

With reference to FIG. 4, a vehicle 410 (although shown in FIG. 4 as a passenger car) might comprise a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like, and which might comprise one or more vehicle components, some of which might be IoT-capable devices or systems. The IoT-capable vehicle components, in some embodiments, might include, but are not limited to, a vehicle computing or control node 415, an engine 420, an electronic throttle control ("ETC") system 425, a vehicle brake system 430, an engine temperature sensor 435, a fuel level sensor 440, one or more proximity sensors 445 (e.g., vehicle camera-based collision avoidance system, the vehicle radar-based proximity detection system, the vehicle lidar-based proximity detection system, the vehicle sonar-based proximity detection system, etc.), one or more tire diagnostic sensors 450 (e.g., tire-pressure sensors, tire thread sensors, tire temperature sensors, tire slip sensors, etc.), one or more other sensors 455, a navigation system 460, a vehicle (analog or digital) instrument gauge cluster or vehicle heads-up-display ("HUD") system 465, and/or the like. Herein, the dash-lined modules representing the various vehicle components described above denote that the particular vehicle components are at or below the surface of the body of the vehicle 410.

In some cases, the one or more other sensors 455 might include, but not limited to, one or more other temperature sensors (e.g., heat sensors, infrared sensors, thermometers, etc.), one or more light sensors (e.g., ambient light sensors, luminosity sensors, illuminance sensors, solar light sensors, etc.), one or more speed sensors, one or more cameras, one or more location sensors (e.g., global positioning system ("GPS") devices, global navigation satellite system ("GNSS") devices, other location sensors, etc.), one or more air quality sensors, one or more carbon monoxide sensors, one or more smoke detectors, one or more fluid leak detectors, one or more contact sensors (e.g., for the door lock system, the hood ajar detector, the trunk ajar detector, the moon/sky light ajar detector, the window open detector, and/or the like), one or more audio sensors, one or more accelerometers, one or more telecommunications signal sensors, one or more fluid leak detectors, one or more occupant sensors, one or more impact sensors, one or more stress sensors, or one or more suspension system diagnostic sensors, and/or the like.

In some embodiments, the PSAP computing system 405 might interact in a machine-to-machine manner with each and to control each of at least one of one or more IoT-capable vehicle components and/or IoT-capable sensors that might be embodied within one or more of these devices or systems or embodied in stand-alone housings. Additionally and/or alternatively, the PSAP computing system 405 might interact in a machine-to-machine manner with the vehicle computing or control node 415 (also referred to herein as "computing systems") and the vehicle control node 415 might interact in a machine-to-machine manner with each of at least one of one or more IoT-capable vehicle components and/or IoT-capable sensors that might be embodied within one or more of these devices or systems or embodied in stand-alone housings.

The following is an example of system 400 being used in response to a car accident occurring with vehicle 410. Although a car accident is being used as an example, PSAP computing system 405 might control different devices/sensors based on different emergency situations. These emergency situations might include, without limitation, at least one of an earthquake, a flood, a personal injury, a medical situation, a fire, a robbery, a burglary, a carjacking, and/or the like.

For example, in the case of a car accident with vehicle 410, the PSAP computing system 405 might receive at least one first message (e.g., a voice message, text message, video message, etc.) indicative of an emergency situation occurring with vehicle 410. The emergency message might be sent by a user utilizing one or more user or electronic devices. Additionally and/or alternatively, the emergency message indicative of an emergency situation might be sent by a device located within vehicle 410 with one or more IoT-capable sensors (e.g., one or more impact sensors, one or more smoke detectors, etc.). The devices with the one or more IoT-capable sensors may be communicatively coupled to the PSAP computing system 405 via one or more networks, via control or management nodes, and/or the like.

PSAP computing system 405 may then analyze the first message indicative of an emergency to determine one or more first actions to be taken in response to the emergency situation. In this case, PSAP computing system 405 may analyze the first message and may detect one or more key words associated with the emergency (e.g., accident, impact, fire, etc.). Alternatively, because one or more impact sensors had sent an indication that they detected an impact, the PSAP computing system 405 might determine that there has been an accident. Based on a determination that an accident has occurred, PSAP computing system 405 may then determine one or more actions to address the accident.

In various embodiments, the PSAP computing system 405 might identify one or more devices to address the accident. For example, PSAP computing system 405 might identify one or more first vehicular components associated with a vehicle known to be associated with a user (e.g., one or more automatic locks, one or more seat belt holders, one or more automated driving systems, and/or the like), one or more utility devices associated with a utility service provider supplying at least one of electrical power, gas, or water on a roadway, one or more second vehicular components associated with each of one or more emergency response vehicles (e.g., one or more automated driving systems, one or more global positioning systems, and/or the like), or one or more emergency response devices (e.g., one or more global positioning systems, one or more mobile phones, one or more tablets, and/or the like) associated with one or more emergency responders for performing the determined one or more first actions to be taken to address the accident.

Additionally and/or alternatively, the PSAP computing system 405 may autonomously control at least one of the identified one or more devices to address the accident. For example, in a vehicle associated with the customer, one or more car doors, windows, or trunk may be unlocked or opened, one or more seatbelts may be unbuckled, one or more biometric sensors/health sensors may be located or monitored to determine the health of one or more users, and/or the like. One or more utility devices associated with a roadway supplying at least one of electrical power, gas, or water to the customer premises might be controlled to turn water, gas, or electricity on or off, to reroute the flow of water, gas, or electricity, or to adjust the flow amount of water, gas, or electricity, or the like. One or more second vehicular components associated with each of one or more emergency response vehicles might be controlled to drive the emergency response vehicles to the location of the accident. These are just some examples of the devices that the PSAP computing system 405 might control to address the car accident with vehicle 410.

Although the example of the car accident was used as an example of the emergency situation indicated in the first message, similar methods may be used to address other emergency situations, such as, but not limited to, flooding, earthquakes, personal injuries in a car, medical injuries or complications in a car, gas leaks, robberies, intruders in a car, and/or the like.

Figure 5:
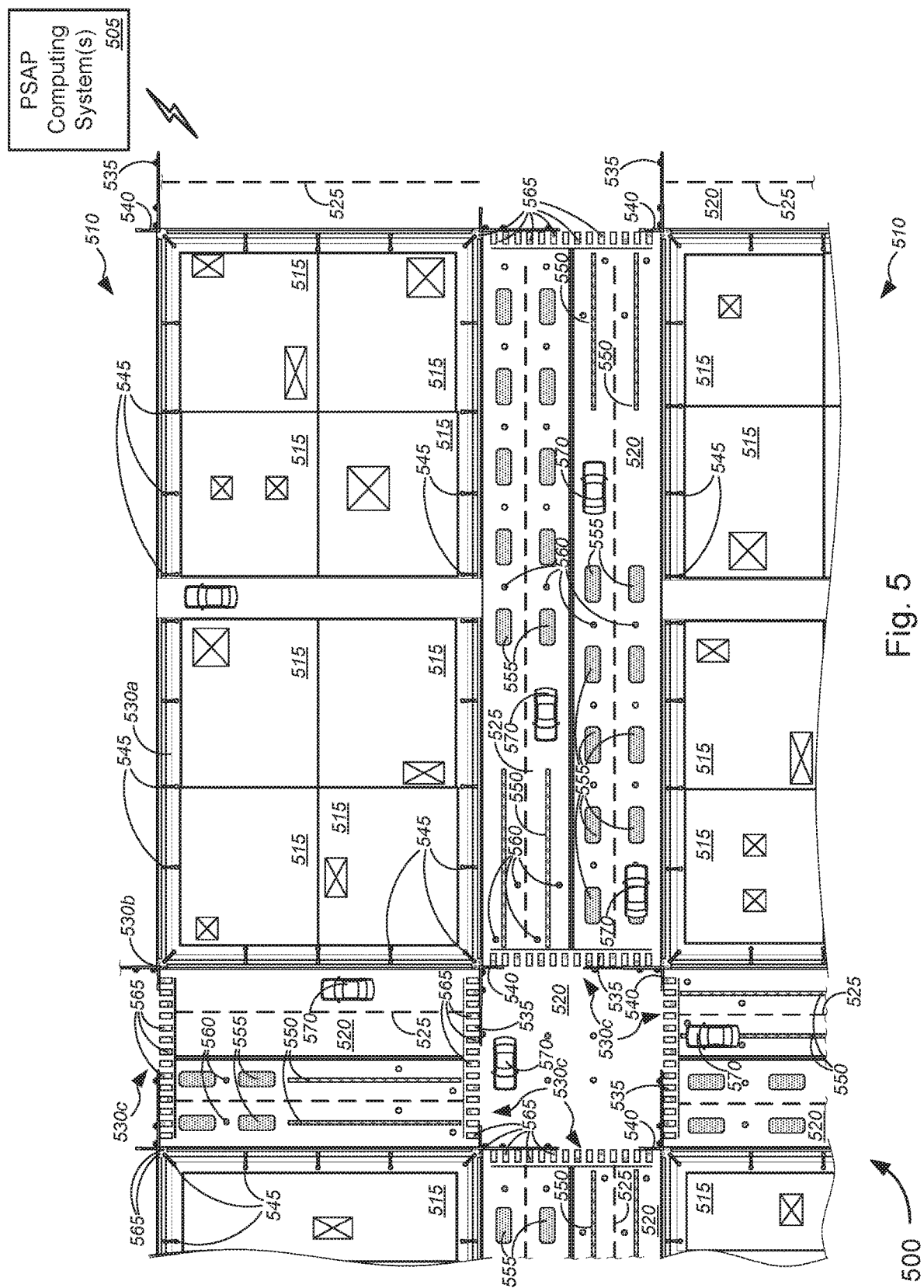
FIG. 5 is a schematic diagram illustrating a system for implementing IoT-based smart roadway functionality with a PSAP, in accordance with various embodiments.

FIG. 5 is a schematic diagram illustrating a system 500 for implementing IoT-based smart roadway functionality, with a PSAP computing system 505, in accordance with various embodiments.

With reference to FIG. 5, system 500 might comprise a city block 510. Although a city block 510 is shown if FIG. 5, other geographical man-made constructs might similarly apply, such constructs including, but not limited to, suburban sub-divisions, town centers, downtown districts, up-town districts, towns, villages, neighborhoods, and/or the like (collectively referred to herein as "city block" for simplicity of illustration). In some embodiments, a city block 510 might include, without limitation, one or more buildings or premises 515 (which might correspond to customer premises 300 of FIG. 3, which as described above, might comprise a home, building, business premises, commercial office, school, industrial building, etc.), one or more roadways 520 (which might include, without limitation, at least one of a local road, a main road, a highway, an airport apron, an airport ramp, an airport runway, a canal, a lock, or a waterway, and/or the like), one or more lane markers 525, one or more pathways 530, one or more traffic control signal devices 535, one or more roadway street lights 540, one or more sidewalk or pedestrian street lights 545, one or more roadway-embedded battery charging nodes or strips 550, one or more roadway-embedded power generation nodes 555, one or more roadway-embedded sensors 560, one or more pathway-embedded sensors 565, one or more vehicles 570 (which might correspond to vehicle 400 of FIG. 4, which as described above, might comprise a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like), and/or the like.

According to some embodiments, the one or more lane markers 525 might comprise one or more dynamic lane change markers. In some cases, the one or more roadway-embedded battery charging nodes or strips 550 and the one or more roadway-embedded power generation nodes 555 might respectively charge batteries in electric vehicles as the vehicles are travelling on the roadway 520 over the battery charging nodes (or while parked) and generate electrical power from solar energy, heat or friction energy from solar radiation or vehicle travel, and/or pressure transduction from vehicle passage, as described in detail below. The one or more roadway and/or pathway sensors 560 and 565, respectively, might each include, but are not limited to, at least one of one or more temperature sensors, one or more light sensors (e.g., ambient light sensors, luminosity sensors, illuminance sensors, solar light sensors, etc.), one or more humidity sensors, one or more motion sensors, one or more structural integrity sensors, one or more pressure sensors, one or more air quality sensors, one or more communications signal detectors, one or more seismic sensors, one or more weather station sensors, one or more moisture sensors, one or more wind sensors, one or more particulate sensors, one or more impact sensors, one or more stress sensors, or one or more location sensors, and/or the like.

In some embodiments, a PSAP computing system 505 might interact in a machine-to-machine manner with each of at least one of one or more IoT-capable devices (e.g., the one or more lane markers 525, the one or more traffic control signal devices 535, the one or more roadway street lights 540, the one or more sidewalk or pedestrian street lights 545, the one or more roadway-embedded battery charging nodes or strips 550, the one or more roadway-embedded power generation nodes 555, the one or more vehicles 570, etc.) and/or IoT-capable sensors (the one or more roadway-embedded sensors 560, one or more pathway-embedded sensors 565, or other sensors (e.g., those that might be embodied within one or more of these devices or systems or embodied in stand-alone housings).

In some cases, the system as described herein may be used in adjunct integral areas, including, but not limited to, Interstate rest stops, a weigh station, a cattle guard, a state/national park entrance, a toll booth, median services (such as gas stations, restaurants, etc.), although these may be more prevalent on private toll ways or the like.

The following is an example of system 500 being used in response to an earthquake occurring in city block 510. Although an earthquake is being used as an example, PSAP computing system 505 might control different devices/sensors based on different emergency situations. These emergency situations might include, without limitation, at least one of a fire, a car accident, a flood, a personal injury, a medical situation, a fire, a robbery, a burglary, an intruder, and/or the like.

For example, in the case of an earthquake, and/or the like, the PSAP computing system 505 might receive at least one first message (e.g., a voice message, text message, video message, etc.) indicative of an emergency situation occurring on roadway 520. The emergency message might be sent by a user utilizing one or more user or electronic devices. Additionally and/or alternatively, the emergency message indicative of an emergency situation might be sent by a device with one or more IoT-capable sensors (e.g., one or more motion sensors, one or more position sensors, etc.). The devices with the one or more IoT-capable sensors may be communicatively coupled to the PSAP computing system 505 via one or more networks, via control or management nodes, and/or the like.

In the case of an earthquake, PSAP computing system 505 may then analyze the first message indicative of an emergency to determine one or more first actions to be taken in response to the emergency situation. In this case, PSAP computing system 505 may analyze the first message and may detect one or more key words associated with the emergency (e.g., earthquake, fire, location, etc.). Alternatively, the PSAP computing system 505 might determine the emergency situation from the information received from the one or more sensors located in roadway 520. Based on a determination that an emergency is occurring at a determined location, the PSAP computing system 505 may then determine one or more actions to address the earthquake. PSAP computing system 505 may prioritize certain areas of the city that experienced larger seismic activity and direct emergency responders to these locations first.

In various embodiments, the PSAP computing system 505 might identify one or more devices to address the earthquake in city block 510. For example, PSAP computing system 505 might identify at least one of one or more household devices associated with a customer premises, one or more first vehicular components associated with a vehicle known to be associated with a user (e.g., one or more automatic locks, one or more seat belt holders, one or more automated driving systems, and/or the like), one or more utility devices associated with a utility service provider supplying at least one of electrical power, gas, or water on a roadway, one or more second vehicular components associated with each of one or more emergency response vehicles (e.g., one or more automated driving systems, one or more global positioning systems, and/or the like), or one or more emergency response devices (e.g., one or more global positioning systems, one or more mobile phones, one or more tablets, and/or the like) associated with one or more emergency responders for performing the determined one or more first actions to be taken to address the accident.

Additionally and/or alternatively, the PSAP computing system 505 may autonomously control at least one of the identified one or more devices to address the earthquake. For example, in a customer premises, one or more doors may be unlocked, one or more biometric sensors or health trackers may be monitored to determine an identity, health, or location of a user, and/or the like. In this way, PSAP computing system 505 may determine where a user is buried under a piece of rubble and whether the user is alive. In a vehicle 570 associated with the user, one or more car doors, windows, or trunk may be unlocked or opened, one or more seatbelts may be unbuckled, one or more biometric sensors/ health sensors may be located or monitored to determine the health of one or more users, and/or the like. One or more utility devices associated with a roadway supplying at least one of electrical power, gas, or water to the customer premises might be controlled to turn water, gas, or electricity on or off, to reroute the flow of water, gas, or electricity, or to adjust the flow amount of water, gas, or electricity, or the like. One or more streetlights may be lit to direct one or more users away from dangerous areas. One or more second vehicular components associated with each of one or more emergency response vehicles might be controlled to drive the emergency response vehicles to the locations requiring help. These are just some examples of the devices that the PSAP computing system 505 might control to address the earthquake occurring on city block 510.

Although the example of the earthquake was used as an example of the emergency situation indicated in the first message, similar methods may be used to address other emergency situations, such as, but not limited to, fire, car accidents, flooding, personal injuries in a car, medical injuries or complications in a car, gas leaks, robberies, intruders in a car, and/or the like.

Figure 6:
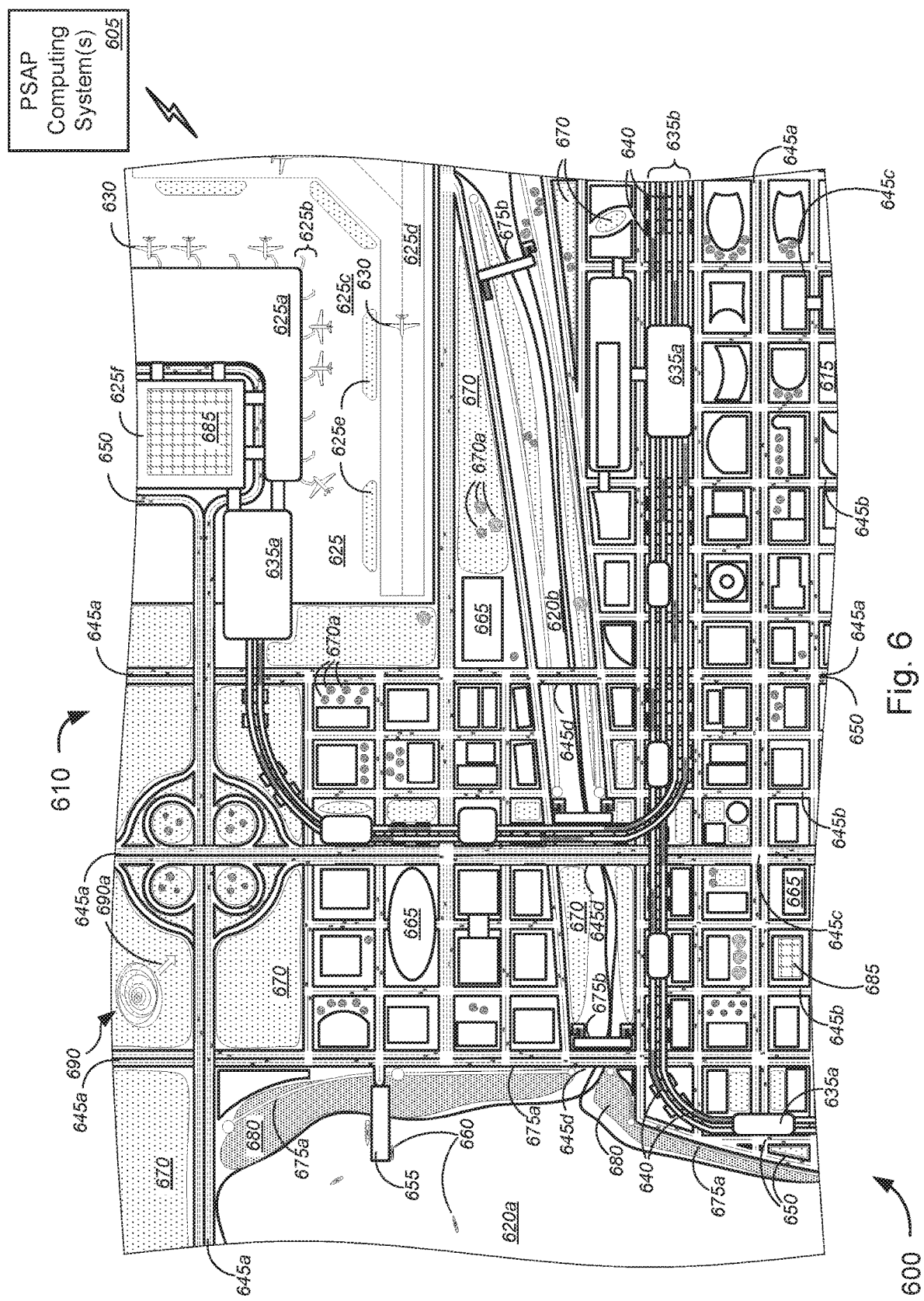
FIG. 6 is a schematic diagram illustrating a system for implementing IoT-based smart city functionality with a PSAP, in accordance with various embodiments.

FIG. 6 is a schematic diagram illustrating a system 600 for implementing IoT-based smart city functionality, in accordance with various embodiments.

With reference to FIG. 6, a system 600 might include a PSAP computing system 605 and population area 610—which might comprise a sub-division, a collection of sub-divisions, a village, a town, a city, a municipal region, a state, a province, a collection of states, a collection of provinces, an island, a collection of islands, a country, a collection of countries, a continent, a collection of continents, a space station, a space vehicle, an orbital habitat, or a habitat disposed on a different planetary body, or the like (collectively referred to herein as "a population area," "a smart city," or the like)—might comprise a city block 615. A city block 615 (as described above with respect to FIG. 5) might comprise a city block or other geographical man-made constructs including, but not limited to, suburban sub-divisions, town centers, down town districts, up-town districts, towns, villages, neighborhoods, and/or the like (collectively referred to herein as "city block" for simplicity of illustration).

According to some embodiments, the population area or smart city 610 might further include, without limitation, one or more bodies of water 620*a* (e.g., oceans, lakes, bays, lagoons, ponds, etc.), one or more waterways 620*b* (e.g., rivers, streams, estuaries, and/or the like), an airport 625 (which might include, but is not limited to, one or more airport terminals, hangars, control towers, or service buildings 625*a*, one or more terminal gates and ramps 625*b*, one or more airport aprons 625*c*, one or more runways 625*d*, one or more greenways or plant life 625*e*, one or more parking structures 625*f*, and/or the like), one or more airplanes or other aviation vehicles 630, one or more public transit systems 635 (which might include, but are not limited to, one or more transit terminals or stations 635*a*, one or more transits tracks or routes 635*b*, one or more transit vehicles 640 (which might include, without limitation, one or more light-rail trains, one or more commuter trains, one or more regional trains, one or more magnetic levitation ("maglev") trains, one or more pneumatic-tube-based vehicles, one or more high-speed trains, one or more buses, one or more trams, one or more street cars, etc.)), one or more roadways 645 (which might include, without limitation, one or more highways or freeways 645*a*, one or more main roads or local roads 645*b*, one or more residential roads (not shown), one or more rural roads (not shown), one or more intersections 645*c*, one or more bridges 645*d*, etc.; and which might correspond to roadway 520 in FIG. 5), one or more vehicles 650 (which might correspond to vehicles 400 of FIG. 4 or 570 of FIG. 5, which as described above, and might comprise a car, minivan, pickup truck, a motorcycle, an all-terrain vehicle, a scooter, a police vehicle, a fire engine, an ambulance, a recreational vehicle, a semi-tractor-trailer truck, a commercial truck, a bus, and/or the like), one or more marine ports or marinas 655, one or more sea-faring vehicles 660 (including, but not limited to, boats, ships, submersibles, amphibious vehicles, personal watercrafts (e.g., kayaks, canoes, rafts, surfboards, paddle boards, jet skis, speedboats, etc.), etc.), one or more buildings 665 (which might correspond to buildings or premises 310 of FIG. 3 or 515 of FIG. 5, which as described above, might comprise homes, buildings, business premises, commercial offices, schools, industrial buildings, etc.), one or more greenways or parks 670 (e.g., public parks, arboreta, gardens, nature preserves, forests, rainforests, orchards, farms, etc.), one or more trees or plants 670*a* (e.g., lawns, trees, bushes, shrubs, flowers, plants, and/or the like), one or more pathways 675 (including, one or more walkways or bicycle paths 675*a*, one or more pedestrian bridges 675*b*, etc.), one or more beaches 680, one or more solar arrays 685, and/or one or more natural or manmade disasters 690 (which might include, without limitation, tornados, flooding, lightning storms, hurricanes, blizzards, fires, smog, meteor impact, airplane crash, automobile accident, construction accident, train accident, building collapse, dam breach, or terrorist attack, and/or the like) and the path or affected areas of the disasters 690*a* (as depicted in FIG. 6 as an arrow).

In some embodiments, a city block 615 might include, without limitation, one or more buildings or premises (which might correspond to customer premises 310 of FIG. 3, which as described above, might comprise a home, building, business premises, commercial office, school, industrial building, etc.), one or more roadways 645, one or more lane markers, one or more pathways, one or more traffic control signal devices, one or more roadway street lights, one or more sidewalk or pedestrian street lights, one or more roadway-embedded battery charging nodes or strips, one or more roadway-embedded power generation nodes, one or more roadway-embedded sensors, one or more pathway-embedded sensors, one or more vehicles (which might correspond to vehicle 410 of FIG. 4, which as described above, might comprise a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like), and/or the like.

The one or more roadway and/or pathway sensors, respectively, might each include, but are not limited to, at least one of one or more temperature sensors, one or more light sensors (e.g., ambient light sensors, luminosity sensors, illuminance sensors, solar light sensors, etc.), one or more humidity sensors, one or more motion sensors, one or more structural integrity sensors, one or more pressure sensors, one or more air quality sensors, one or more communications signal detectors, one or more seismic sensors, one or more weather station sensors, one or more moisture sensors, one or more wind sensors, one or more particulate sensors, one or more impact sensors, or one or more location sensors, and/or the like.

In some embodiments, a PSAP computing system 605 might interact in a machine-to-machine manner with each of at least one of one or more IoT-capable devices (e.g., the one or more lane markers, the one or more traffic control signal devices, the one or more roadway street lights, the one or more sidewalk or pedestrian street lights, the one or more roadway-embedded battery charging nodes or strips, the one or more roadway-embedded power generation nodes the one or more vehicles) and/or IoT-capable sensors (the one or more roadway-embedded sensors, one or more pathway-embedded sensors, or other sensors (e.g., those that might be embodied within one or more of these devices or systems or embodied in stand-alone housings)).

The following is an example of system 600 being used in response to a flood. Although a flood is being used as an example, PSAP computing system 605 might control different devices/sensors based on different emergency situations. These emergency situations might include, without limitation, at least one of an earthquake, a flood, tornado, a personal injury, a medical situation, a fire, a robbery, a burglary, an intruder, and/or the like.

For example, in the case of a flood, and/or the like, the PSAP computing system 605 might receive at least one first message (e.g., a voice message, text message, video message, etc.) indicative of an emergency situation occurring within smart city 610. The emergency message might be sent by a user utilizing one or more user or electronic devices. Additionally and/or alternatively, the emergency message indicative of an emergency situation might be sent by a device with one or more IoT-capable sensors (e.g., one or more water detection sensors, one or more water level sensors, etc.). The devices with the one or more IoT-capable sensors may be communicatively coupled to the PSAP computing system 605 via one or more networks, via control or management nodes, and/or the like.

In the case of an emergency with a customer premises, an emergency with a vehicle, etc., PSAP computing system 605 may analyze the first message indicative of an emergency to determine one or more first actions to be taken in response to the emergency situation. In this case, PSAP computing system 605 may analyze the first message and may detect one or more key words associated with the emergency (e.g., water, flash flood, flooding, tornado, location, etc.). Alternatively, the PSAP computing system 605 might determine the emergency situation from the information received from the one or more sensors located in an IOT-enabled device. Based on a determination that an emergency is occurring at a determined location, the PSAP computing system 605 may then determine one or more actions to address the accident.

In various embodiments, the PSAP computing system 605 might identify and control one or more city devices to address the emergency situation. For example, PSAP computing system 605 might identify and control one or more traffic lights located in a city, one or more other autonomous vehicles located on a roadway, one or more autonomous vehicles associated with emergency responders, and/or the like, to ensure that one or more emergency response vehicles reach an emergency situation without encountering traffic or stoplights. Additionally and/or alternatively, the PSAP computing system 605 might control one or more user vehicles to guide the vehicles out of the flood zone. Additionally and/or alternatively, the PSAP computing system 605 might control one or more water pipes in a roadway to prevent additional flooding. These are just some examples of the devices that the PSAP might control to address the flooding situation occurring in population area 610.

Although the example of the flood was used as an example of the emergency situation indicated in the first message, similar methods may be used to address other emergency situations, such as, but not limited to, car accidents, fires, earthquakes, tornados, personal injuries in a car, medical injuries or complications in a car, gas leaks, robberies, intruders in a car, and/or the like.

Figure 7A:
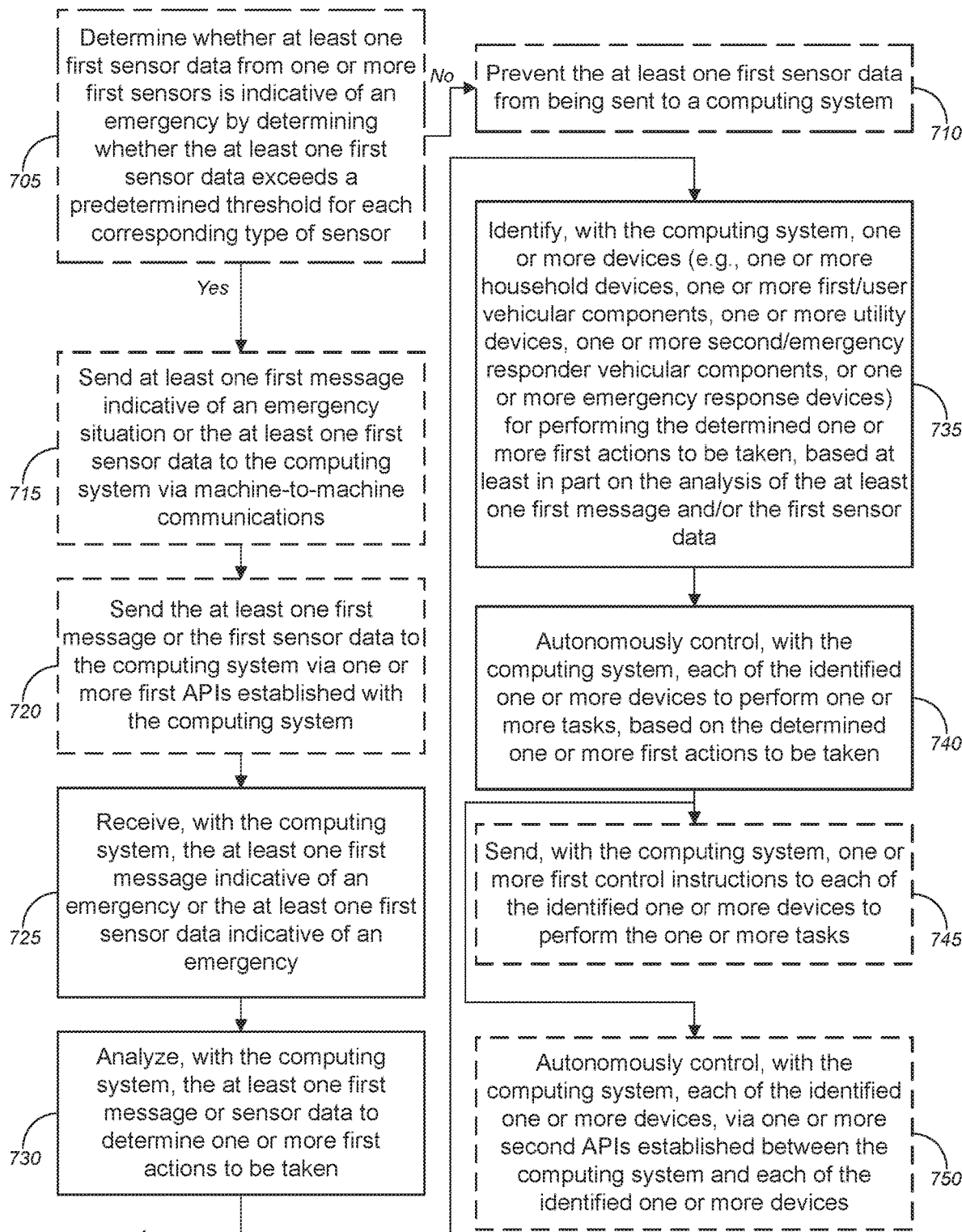
FIGS. 7A-7C are flow diagrams illustrating a method for implementing IoT-based smart environment functionality with a PSAP, in accordance with various embodiments.
Figure 7B:
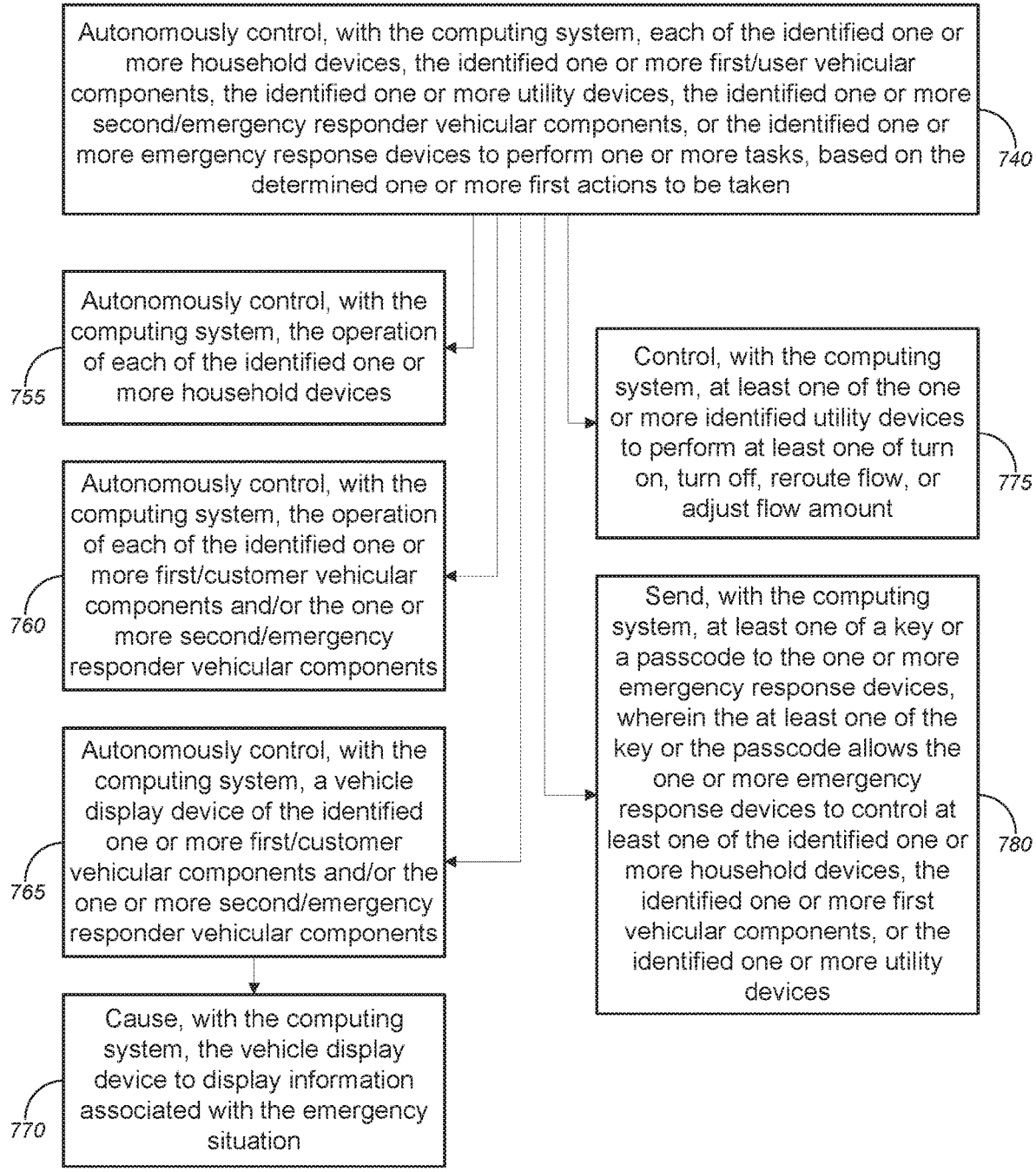
Figure 7C:
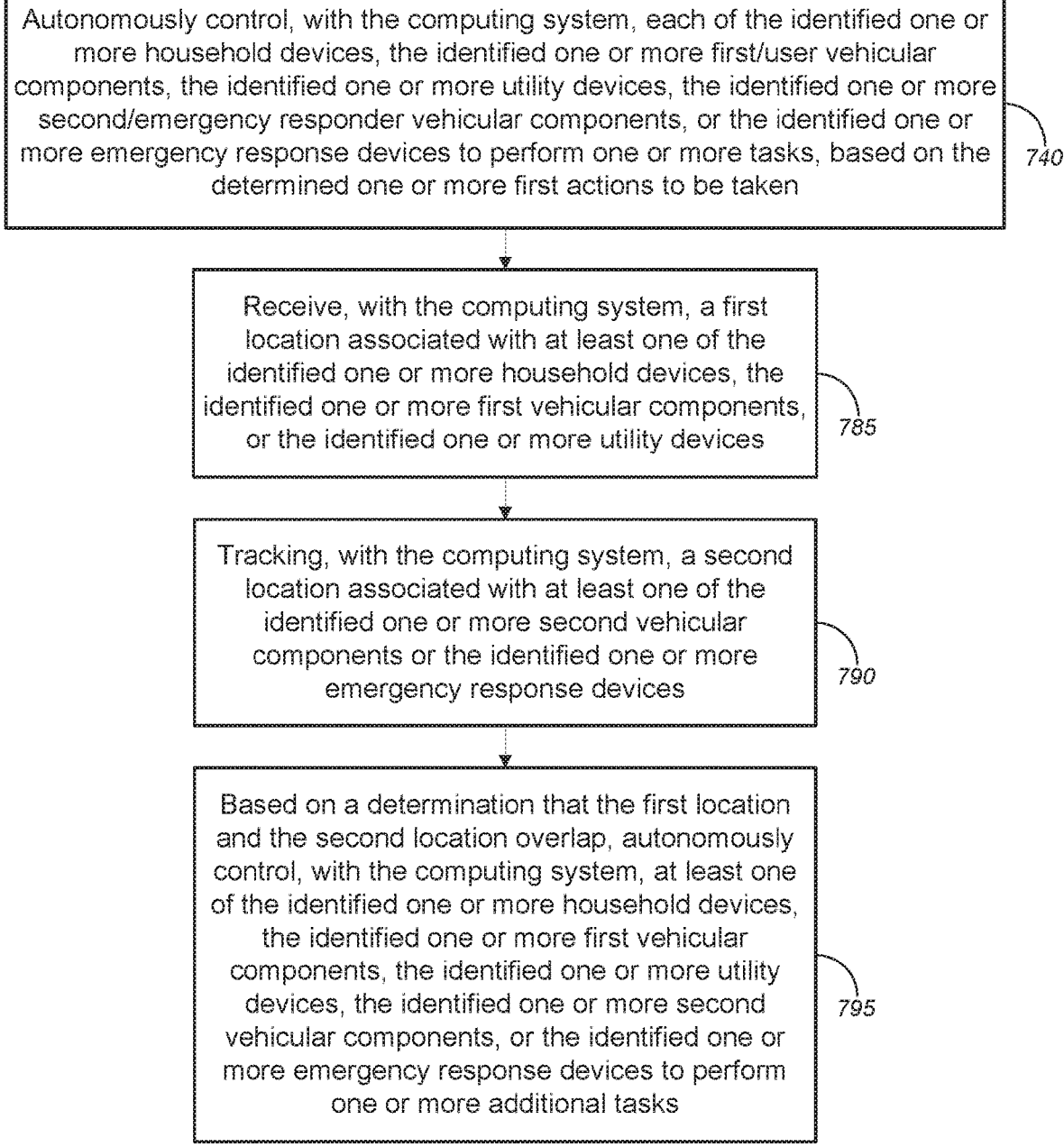

FIGS. 7A-7C (collectively, "FIG. 7") are flow diagrams illustrating a method 700 for implementing IoT-based smart home, building, or customer premises functionality, smart vehicle functionality, smart utility functionality, smart roadway functionality, smart city functionality, with a PSAP, in accordance with various embodiments. FIG. 7A depicts the method 700 for implementing IoT-based smart home, building, or customer premises functionality, smart vehicle functionality, smart utility functionality, smart roadway functionality, or smart city functionality, with a PSAP, while FIGS. 7B and 7C depict various different embodiments for autonomously controlling each of the identified one or more household devices, the identified one or more first vehicular components, the identified one or more utility devices, the identified one or more second vehicular components, or the identified one or more emergency response devices, the identified roadway devices, the identified city devices, and/or the like, to perform the one or more tasks in the method 700 of FIG. 7A.

While the techniques and procedures are depicted and/or described in a certain order for purposes of illustration, it should be appreciated that certain procedures may be reordered and/or omitted within the scope of various embodiments. Moreover, while the method 700 illustrated by FIG. 7 can be implemented by or with (and, in some cases, are described below with respect to) the systems 100, 200, 300, 400, 500, and 600 of FIGS. 1, 2, 3, 4, 5, and 6, respectively (or components thereof), such methods may also be implemented using any suitable hardware (or software) implementation. Similarly, while each of the systems 100, 200, 300, 400, 500, and 600 of FIGS. 1, 2, 3, 4, 5, and 6, respectively (or components thereof), can operate according to the method 700 illustrated by FIG. 7 (e.g., by executing instructions embodied on a computer readable medium), the systems 100, 200, 300, 400, 500, and 600 of FIGS. 1, 2, 3, 4, 5, and 6, respectively, can each also operate according to other modes of operation and/or perform other suitable procedures.

With reference to FIG. 7A, method 700, at optional block 705, might comprise determining whether at least one first sensor data from one or more first sensors is indicative of an emergency by determining whether the at least one first sensor exceeds a predetermined threshold (e.g., amount of smoke, amount of gas, water level, heart rate, etc.) for each corresponding type of sensor. In response to a determination that the at least one first sensor data from the one or more first sensors does not exceed the predetermined threshold for at least one corresponding type of sensor, the at least one first sensor data is prevented from being sent to a computing system located at a PSAP (optional block 710). On the other hand, in response to a determination that the at least one first sensor data from the one or more first sensors does exceed the predetermined threshold for each corresponding type of sensor, the at least one first sensor data or the at least one first message is sent to the computing system located at the PSAP via machine-to-machine communications (optional block 715). Alternatively, at optional block 715, a first message (e.g., text, voice, video, etc.) indicative of an emergency and/or at least one first sensor data indicative of an emergency may be sent to a computing system located at the PSAP. In some embodiments, sending the at least one first sensor data or first message indicative of the emergency to the computing system via machine-to-machine communications comprises sending the at least one first sensor data to the computing system via machine-to-machine communications, via one or more first application programming interfaces ("APIs") established with the computing system (optional block 720).

At block 725, method 700 might comprise receiving, with the computing system, the at least one first message indicative of an emergency and/or the at least one first sensor data indicative of an emergency from the one or more Internet of Things ("IoT")-capable devices via machine-to-machine communications, each of the two or more IoT-capable devices comprising the one or more first sensors that collect the at least one first sensor data. In some embodiments, a "heartbeat" may be used, in which a wake-up signal/response pair is used to validate that the communication channel is working. After x number of missed attempts, the IoT-capable device may be marked off-line and unavailable. Method 700, at block 730, might comprise analyzing, with the computing system, the at least one first message or the first sensor data to determine one or more first actions to be taken in response to the emergency situation. Method 700 might further comprise, at block 735, identifying, with the computing system, one or more devices (e.g., one or more household devices, one or more first/user vehicular components, one or more utility devices, one or more second/emergency responder vehicular components, one or more emergency response devices, one or more roadway devices, one or more city devices, and/or the like) for performing the determined one or more first actions to be taken to address the emergency situation, based at least in part on the analysis of the at least one first message and/or the first sensor data. At block 740, method 700 might comprise autonomously controlling, with the computing system, each of the identified one or more devices to perform one or more tasks, based on the determined one or more first actions to be taken.

According to some embodiments, autonomously controlling, with the computing system, each of the identified one or more devices to perform one or more tasks (at block 740) might comprise sending, with the computing system, one or more first control instructions to each of the identified one or more devices to perform the one or more tasks, based on the determined one or more first actions to be taken (optional block 745). Additionally and/or alternatively, autonomously controlling, with the computing system, each of the identified one or more devices to perform one or more tasks (at block 740) might comprise autonomously controlling, with the computing system, each of the identified one or more household devices, via one or more second APIs established between the computing system and each of the identified one or more devices (optional block 750).

Turning to FIG. 7B, autonomously controlling, with the computing system, each of the identified one or more household devices to perform one or more tasks (at block 740) might comprise autonomously controlling, with the computing system, each of the identified one or more household devices to address the emergency situation (block 755).

The one or more household devices might include at least one of one or more temperature sensors (e.g., heat sensors, infrared sensors, thermometers, etc.), one or more light sensors (e.g., ambient light sensors, luminosity sensors, illuminance sensors, solar light sensors, etc.), one or more humidity sensors, one or more motion sensors, one or more cameras, one or more biometric sensors, one or more health sensors (e.g., fitness tracker, heart rate sensor, etc.), one or more location sensors (e.g., global positioning system ("GPS") devices, global navigation satellite system ("GNSS") devices, other location sensors, etc.), one or more air quality sensors, one or more carbon monoxide sensors, one or more smoke detectors, one or more gas detectors, one or more water leak detectors, one or more contact sensors, one or more audio sensors, one or more accelerometers, one or more proximity sensors, one or more radiation sensors, one or more telecommunications signal sensors, and/or the like. The one or more household sensor(s) might include at least one of one or more temperature sensors (e.g., heat sensors, infrared sensors, thermometers, etc.), one or more light sensors (e.g., ambient light sensors, luminosity sensors, illuminance sensors, solar light sensors, etc.), one or more humidity sensors, one or more motion sensors, one or more cameras, one or more biometric sensors, one or more health sensors (e.g., fitness tracker, heart rate sensor, etc.), one or more location sensors (e.g., global positioning system ("GPS") devices, global navigation satellite system ("GNSS") devices, other location sensors, etc.), one or more air quality sensors, one or more carbon monoxide sensors, one or more smoke detectors, one or more gas detectors, one or more water leak detectors, one or more contact sensors, one or more audio sensors, one or more accelerometers, one or more proximity sensors, one or more radiation sensors, one or more telecommunications signal sensors, and/or the like.

In some embodiments, the one or more first sensors of the one or more household IoT-capable devices might each include, without limitation, one or more thermometers in at least one of the one or more rooms, one or more infrared ("IR") thermometers aimed at one or more positions in at least one of the one or more rooms, one or more air flow sensors in at least one of the one or more rooms, one or more air flow sensors in air ducts directed toward at least one of the one or more rooms, one or more indoor solar light sensors, one or more outdoor solar light sensors, one or more outdoor wind sensors, one or more neighborhood weather station sensors, one or more regional weather station sensors, one or more motion detectors detecting presence of people or animals in at least one of the one or more rooms, or one or more humidity sensors in at least one of the one or more rooms, and/or the like. The one or more household devices might include, but are not limited to, one or more of a furnace, an air conditioner, one or more automated window opening or closing systems, one or more automated door opening or closing systems, one or more automated skylight opening or closing systems, one or more automated window covering systems, one or more humidifiers, one or more dehumidifiers, or one or more ventilation fans, and/or the like, in some cases, using control signals from the computing system directly or indirectly to actuators, solenoids, motors, switches, relays, electronic circuits, logic, and/or the like, where said devices, communications, protocols, and/or other systems employ physical, electronic, and logical security mechanisms to prevent unauthorized access and/or to maintain privacy, or the like.

In order to address the emergency situation, the computing system might control operation of at least one of the furnace to turn off or on, the air conditioner to turn off or on, the one or more thermostats to control a HVAC system, the one or more automated window opening or closing systems to open or close one or more windows or to lock or unlock one or more windows, the one or more automated door opening or closing systems to open or close one or more doors or to lock or unlock one or more doors, the one or more automated skylight opening or closing systems to open or close one or more skylights or to lock or unlock one or more skylights, the one or more automated window covering systems to cover or uncover the one or more windows, the one or more humidifiers to turn on or off, the one or more dehumidifiers to turn on or off, the one or more ventilation fans to turn on or off, the one or more cameras to view a customer premises or household, the one or more automated lighting systems to light up exit paths, the one or more smoke or gas detectors, the one or more automated gas or water intake valves to turn on or off, or the one or more user devices associated with the at least one person located in the customer premises to determine a location of the user within a customer premises, to determine the health of a user at the customer premises, to determine an identity of a user at the customer premises, and/or the like. These are only some of the examples of the operations that the computing system might cause one or more household devices to perform In some embodiments, autonomously controlling, with the computing system, each of the identified one or more devices (at block 740) might additionally include autonomously controlling, with the computing system, one or more first/user vehicular components and/or the one or more second/emergency responder vehicular components (block 760).

In some embodiments, the identified one or more vehicular components might include, but are not limited to, at least one of a vehicle brake system, a vehicle gear system, a vehicle electronic throttle control ("ETC") system, a vehicle steering system, a vehicle turn signal system, a vehicle heads-up display system, a vehicle digital instrument gauge cluster, a vehicle display device, or a vehicle speaker system, and/or the like. The one or more IoT-capable devices, in some cases, might include, without limitation, at least one of a vehicle camera-based collision avoidance system, a vehicle radar-based proximity detection system, a vehicle lidar-based proximity detection system, a vehicle sonar-based proximity detection system, a location sensor, or a transceiver device in communication with a corresponding transceiver device in each of one or more nearby vehicles, and/or the like.

Controlling operation of the one or more vehicular components, might cause one or more first vehicles to move out of the way of one or more emergency response vehicles, cause one or more second vehicles to drive to the customer premises, and/or the like.

In some cases, autonomously controlling, with the computing system, each of the identified one or more devices (at block 740) might comprise autonomously controlling a vehicle display device of the identified one or more first/user vehicular components and/or the one or more second/emergency responder vehicular components (block 765). Alternatively and/or additionally, autonomously controlling, with the computing system, each of the identified one or more devices (at block 740) might comprise causing the vehicle to display information associated with the emergency situation. For example, the display might show a map of the customer premises or a work flow list indicating tasks for each emergency responder/user to perform described in detail with respect to FIG. 3. The map and/or work flow list may also be displayed on at least one of a device associated with a customer, a device associated with an emergency responder, and/or the like.

In some embodiments, autonomously controlling, with the computing system, each of the identified one or more devices (at block 740) might additionally include autonomously controlling, with the computing system, at least one of the one or more identified utility devices to perform at least one of turn on, turn off, reroute flow, or adjust amount of flow (block 775). The one or more utility devices might be directly controlled by a PSAP computing system. Additionally and/or alternatively, the one or more utility devices may be controlled by a utility computing system located at a premises or facilities of one or more utilities. The utility computing system might receive instructions from the PSAP computing system and then control the one or more utility devices to perform one or more actions contained in the instructions.

The one or more utility devices might include at least one of one or more electrical utility devices, one or more water utility devices, and/or one or more gas utility devices. In a non-limiting example, if the emergency situation is a fire, the computing system might autonomously control one or more gas lines to prevent gas from flowing into the customer premises, turn on sinks, sprinklers, showers, and the like, to prevent the spread of fire, and light up one or more lights to direct one or more users to an exit.

In some embodiments, autonomously controlling, with the computing system, each of the identified one or more devices (at block 740) might additionally include sending, with the computing system, at least one of a key or a passcode to the one or more emergency response devices and/or emergency response vehicles (block 780). The at least one of the key or passcode may allow the one or more emergency response devices to control at least one of the identified one or more household devices, the identified one or more first vehicular components, the identified one or more utility devices, the one or more roadway devices, the one or more city devices, and/or the like. In a non-limiting example, the key or passcode may allow the emergency response devices and/or vehicle to control one or more locks at a customer premises, one or more window locks, one or more traffic lights, and/or the like.

Turning to FIG. 7C, autonomously controlling, with the computing system, each of the identified one or more devices (at block 740) might additionally include receiving, with the computing system, a first location associated with at least one of the identified one or more household devices, the identified one or more first vehicular components, or the identified one or more utility devices (block 785) and tracking, with the computing system, a second location associated with at least one of the identified one or more second vehicular components or the identified one or more emergency response devices. Alternatively, or additionally, autonomously controlling, with the computing system, each of the identified one or more devices (at block 740) might comprise, based on a determination that the first location and the second location overlap, the method 700 might additionally include autonomously controlling, with the computing system, at least one of the identified one or more household devices, the identified one or more first vehicular components, the identified one or more utility devices, the identified one or more second vehicular components, or the identified one or more emergency response devices, and/or the like, to perform one or more additional tasks (block 795).

Exemplary System and Hardware Implementation

Figure 8:
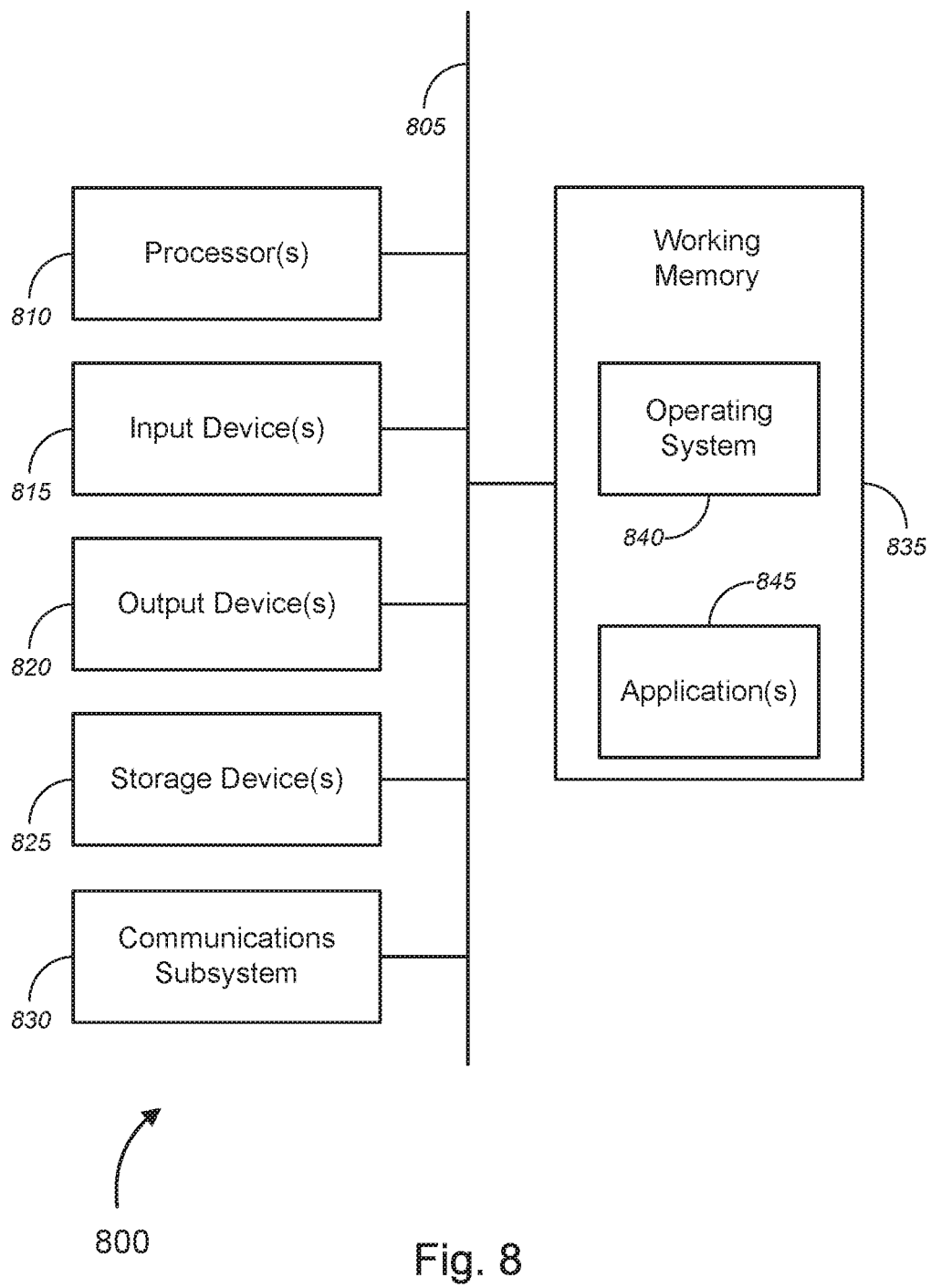
FIG. 8 is a block diagram illustrating an exemplary computer or system hardware architecture, in accordance with various embodiments.

FIG. 8 is a block diagram illustrating an exemplary computer or system hardware architecture, in accordance with various embodiments. FIG. 8 provides a schematic illustration of one embodiment of a computer system 800 of the service provider system hardware that can perform the methods provided by various other embodiments, as described herein, and/or can perform the functions of computer or hardware system (i.e., computing systems 105, 125, 205, 220, 305, 365, 405, 415, 505, and 605, Internet of Things ("IoT")-capable devices 110*a*-110*n*, 215, 325, 330, 335, 340, 350, 355, 370, 375, 380, 410, 420, 425, 430, 460, 465, 535, 540, 545, 550, 555, 570, 630, 635, 640, 650, 660, and 685, IoT-capable sensors 115*a*-115*n*, 210, 435, 440, 445, 450, 455, 560, and 565, devices 120a-120n, analytics engine 145, utility control system 155, etc.) or other devices, as described above. It should be noted that FIG. 8 is meant only to provide a generalized illustration of various components, of which one or more (or none) of each may be utilized as appropriate. FIG. 8, therefore, broadly illustrates how individual system elements may be implemented in a relatively separated or relatively more integrated manner.

The computer or hardware system 8—which might represent an embodiment of the computer or hardware system (i.e., computing systems 105, 125, 205, 220, 305, 365, 405, 415, 505, and 605, Internet of Things ("IoT")-capable devices 110a-110n, 215, 325, 330, 335, 340, 350, 355, 370, 375, 380, 410, 420, 425, 430, 460, 465, 535, 540, 545, 550, 555, 570, 630, 635, 640, 650, 660, and 685, IoT-capable sensors 115a-115n, 210, 435, 440, 445, 450, 455, 560, and 565, devices 120a-120n, analytics engine 145, utility control system 155, etc.), described above with respect to FIGS. 1-7—is shown comprising hardware elements that can be electrically coupled via a bus 805 (or may otherwise be in communication, as appropriate). The hardware elements may include one or more processors 810, including, without limitation, one or more general-purpose processors and/or one or more special-purpose processors (such as microprocessors, digital signal processing chips, graphics acceleration processors, and/or the like); one or more input devices 815, which can include, without limitation, a mouse, a keyboard, and/or the like; and one or more output devices 820, which can include, without limitation, a display device, a printer, and/or the like.

The computer or hardware system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 800 might also include a communications subsystem 830, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 830 may permit data to be exchanged with a network (such as the network described below, to name one example), with other computer or hardware systems, and/or with any other devices described herein. In many embodiments, the computer or hardware system 800 will further comprise a working memory 835, which can include a RAM or ROM device, as described above.

The computer or hardware system 800 also may comprise software elements, shown as being currently located within the working memory 835, including an operating system 840, device drivers, executable libraries, and/or other code, such as one or more application programs 845, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 800 and/or might take the form of source and/or installable code, which, upon compilation and/or installation on the computer or hardware system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 800) to perform methods in accordance with various embodiments of the invention. According to a set of embodiments, some or all of the procedures of such methods are performed by the computer or hardware system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 800, various computer readable media might be involved in providing instructions/code to processor(s) 810 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 825. Volatile media includes, without limitation, dynamic memory, such as the working memory 835. In some alternative embodiments, a computer readable medium may take the form of transmission media, which includes, without limitation, coaxial cables, copper wire and fiber optics, including the wires that comprise the bus 805, as well as the various components of the communication subsystem 830 (and/or the media by which the communications subsystem 830 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 800. These signals, which might be in the form of electromagnetic signals, acoustic signals, optical signals, and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

Figure 9:
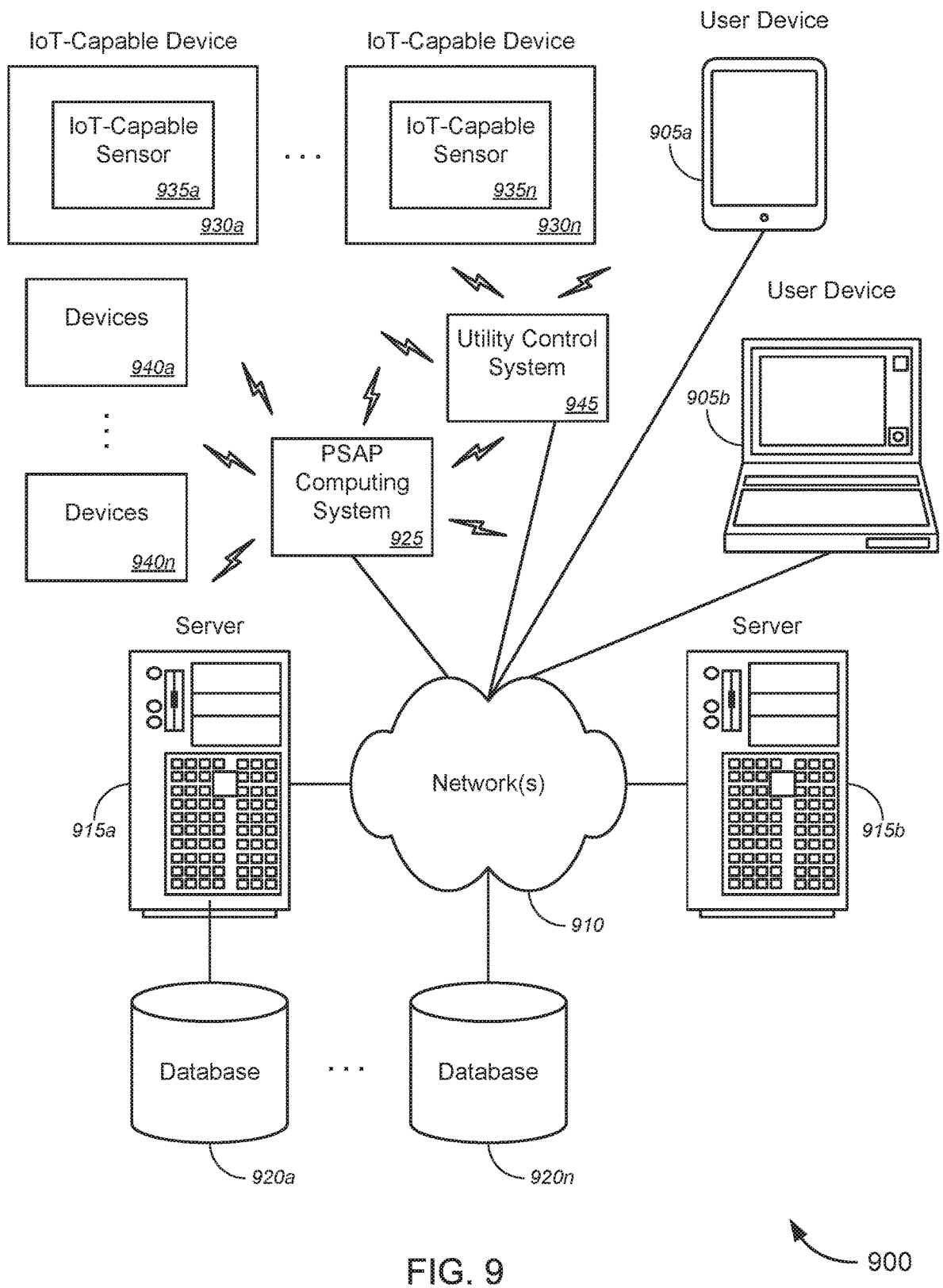
FIG. 9 is a block diagram illustrating an example of a networked system of computers, computing systems, or system hardware architecture, which can be used in accordance with various embodiments.

As noted above, a set of embodiments comprises methods and systems for implementing Internet of Things functionality, with a PSAP, and, in particular embodiments, to methods, systems, apparatus, and computer software for implementing smart environment functionality, with a PSAP, which includes, without limitation, smart home, building, or customer premises functionality, smart vehicle functionality, smart utility functionality, smart roadway functionality, smart city functionality, and/or the like. FIG. 9 illustrates a schematic diagram of a system 900 that can be used in accordance with various embodiments. The system 900 can each include one or more user computers, user devices, or customer devices 905. A user computer, user device, or customer device 905 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 905 can also have any of a variety of applications, including one or more applications configured to perform methods provided by various embodiments (as described above, for example), as well as one or more office applications, database client and/or server applications, and/or web browser applications. Alternatively, a user computer, user device, or customer device 905 can be any other electronic device, such as a thin-client computer, Internet-enabled mobile telephone, and/or personal digital assistant, capable of communicating via a network (e.g., the network(s) 910 described below) and/or of displaying and navigating web pages or other types of electronic documents. Although the exemplary system 900 is shown with two user computers, user devices, or customer devices 905, any number of user computers, user devices, or customer devices can be supported.

Certain embodiments operate in a networked environment, which can include a network(s) 910. The network(s) 910 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 910 (similar to network(s) 130 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 915. Each of the server computers 915 may be configured with an operating system, including, without limitation, any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 might be a data server, a web server, a cloud computing device(s), or the like, as described above. The data server might include (or be in communication with) a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 905 and/or another server 915. In some embodiments, an application server can perform one or more of the processes for implementing Internet of Things functionality, and, in particular embodiments, to methods, systems, apparatus, and computer software for implementing smart environment functionality, which includes, without limitation, smart home, building, or customer premises functionality, smart vehicle functionality, smart roadway functionality, smart city functionality, or the like, as described in detail above. Data provided by an application server may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases, a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer, user device, or customer device 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920a through 920n (collectively, "databases 920"). The location of each of the databases 920 is discretionary: merely by way of example, a database 920a might reside on a storage medium local to (and/or resident in) a server 915a (and/or a user computer, user device, or customer device 905). Alternatively, a database 920n can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle database, that is adapted to store, update, and retrieve data in response to SQL-formatted commands. The database might be controlled and/or maintained by a database server, as described above, for example.

With reference to FIG. 9, according to some embodiments, system 900 might further comprise a computing system 925 located at a PSAP (similar to computing system 105, 205, 305, 405, 505, and 605 of FIGS. 1-6, respectively, or the like), one or more IoT-capable devices 930a-930n (similar to IoT-capable devices 110a-110n, 215, 325, 330, 335, 340, 350, 355, 370, 375, 380, 410, 420, 425, 430, 460, 465, 535, 540, 545, 550, 555, 570, 630, 635, 640, 650, 660, and 685 of FIGS. 1-6, or the like), one or more IoT-capable sensors 935a-935n (similar to IoT-capable sensors 115a-115n, 210, 435, 440, 445, 450, 455, 560, and 565 of FIGS. 1, 2, 4, and 5, or the like), one or more devices 940a-940n (similar to devices 120a-120n of FIG. 1, or the like), and one or more utility computing systems 945 (similar to utility computing system 155 of FIG. 1, or the like). The functions of the system 900 (and its components) are described in greater detail above with respect to FIGS. 1-7.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
  receiving, with a computing system at a public safety answering point ("PSAP"), at least one first message indicative of an emergency situation occurring at a customer premises;

analyzing, with the computing system, the at least one first message to determine one or more first actions to be taken in response to the emergency situation;

identifying, with the computing system, at least one of one or more household devices associated with the customer premises, one or more first vehicular components associated with a vehicle known to be associated with a resident of the customer premises, one or more utility devices associated with a utility service provider supplying at least one of electrical power, gas, or water to the customer premises, one or more second vehicular components associated with each of one or more emergency response vehicles, or one or more emergency response devices associated with one or more emergency responders for performing the determined one or more first actions to be taken, based at least in part on the analysis of the at least one first message; and autonomously controlling, with the computing system, at least one of the identified one or more household devices, the identified one or more first vehicular components, the identified one or more utility devices, the identified one or more second vehicular components, or the identified one or more emergency response devices to perform one or more tasks, based at least in part on the determined one or more first actions to be taken.

2. The method of claim 1, wherein receiving the at least one first message indicative of the emergency situation occurring at the customer premises comprises:

receiving, with the computing system, at least one first sensor data indicative of the emergency situation from each of one or more Internet of Things ("IoT")-capable devices via machine-to-machine communications, each of the one or more IoT-capable devices comprising one or more first sensors that collect the at least one first sensor data at the customer premises.

3. The method of claim 2, wherein the one or more first sensors of each of the one or more IoT-capable devices each comprises one or more thermometers in one or more rooms of the customer premises, one or more infrared ("IR") thermometers aimed at one or more positions in the one or more rooms, one or more air flow sensors in the one or more rooms, one or more air flow sensors in air ducts directed toward the one or more rooms, one or more indoor solar light sensors, one or more outdoor solar light sensors, one or more outdoor wind sensors, one or more neighborhood weather station sensors, one or more regional weather station sensors, one or more motion detectors detecting presence of people or animals in at least one of the one or more rooms or outside the customer premises, one or more humidity sensors in the one or more rooms, one or more smoke detectors detecting smoke in the one or more rooms, one or more gas detection sensors detecting gas in the one or more rooms, one or more biometric sensors identifying at least one person, or one or more health sensors detecting health information for at least one person.

4. The method of claim 2, wherein the at least one first sensor data that is received from each of the one or more IoT-capable devices each comprises sensor data that exceeds a predetermined threshold for each corresponding type of sensor, wherein sensor data that does not exceed the predetermined threshold for each corresponding type of sensor is prevented from being sent to the computing system.

5. The method of claim 2, wherein receiving the at least one first sensor data from each of the one or more IoT-capable devices via machine-to-machine communications comprises:

receiving, with the computing system, at least one first sensor data from each of the one or more IoT-capable devices via machine-to-machine communications, via one or more first application programming interfaces ("APIs") established between the computing system and each of the one or more IoT-capable devices.

6. The method of claim 2, wherein the at least one first sensor data indicates at least one of a type of emergency situation, a location of the emergency situation within the customer premises, locations of live electrical wiring throughout the customer premises, locations of gas sources throughout the customer premises, locations of water sources throughout the customer premises, a location of at least one person within the customer premises, an identity of the at least one person within the customer premises, a location of at least one animal within the customer premises, or health information associated with the at least one person within the customer premises.

7. The method of claim 2, wherein autonomously controlling the at least one of the identified one or more household devices, the identified one or more first vehicular components, the identified one or more utility devices, the identified one or more second vehicular components, or the identified one or more emergency response devices to perform the one or more tasks comprises:

sending, with the computing system, one or more first control instructions to the at least one of the identified one or more household devices, the identified one or more first vehicular components, the identified one or more utility devices, the identified one or more second vehicular devices, or the identified one or more emergency response devices to perform the one or more tasks, based at least in part on the determined one or more first actions to be taken.

8. The method of claim 1, wherein autonomously controlling the at least one of the identified one or more household devices, the identified one or more first vehicular components, the identified one or more utility devices, the identified one or more second vehicular components, or the identified one or more emergency response devices to perform the one or more tasks comprises:

autonomously controlling, with the computing system, the at least one of the identified one or more household devices, the identified one or more first vehicular components, the identified one or more utility devices, the identified one or more second vehicular components, or the identified one or more emergency response devices, via one or more second APIs established between the computing system and each of at least one of the identified one or more household devices, the identified one or more first vehicular components, the identified one or more utility devices, the identified one or more second vehicular components, or the identified one or more emergency response devices.

9. The method of claim 1, wherein the identified one or more household devices comprise one or more of a furnace, an air conditioner, one or more thermostats, one or more automated window opening or closing systems, one or more automated door opening or closing systems, one or more automated skylight opening or closing systems, one or more automated window covering systems, one or more humidifiers, one or more dehumidifiers, one or more ventilation fans, one or more cameras, one or more automated lighting systems, one or more smoke or gas detectors, one or more automated gas intake valves, one or more water intake valves, or one or more user devices associated with at least one person located in the customer premises.

10. The method of claim 9, wherein autonomously controlling the at least one of the identified one or more household devices, the identified one or more first vehicular components, the identified one or more utility devices, the identified one or more second vehicular components, or the identified one or more emergency response devices to perform the one or more tasks comprises:

controlling, with the computing system, operation of at least one of the furnace, the air conditioner, the one or more thermostats, the one or more automated window opening or closing systems, the one or more automated door opening or closing systems, the one or more automated skylight opening or closing systems, the one or more automated window covering systems, the one or more humidifiers, the one or more dehumidifiers, the one or more ventilation fans, the one or more cameras, the one or more automated lighting systems, the one or more smoke or gas detectors, the one or more automated gas or water intake valves, or the one or more user devices associated with the at least one person located in the customer premises.

11. The method of claim 1, wherein the identified one or more first vehicular components or the identified one or more second vehicular components comprise at least one of a vehicle brake system, a vehicle gear system, a vehicle electronic throttle control system, a vehicle guidance system, a vehicle steering system, a vehicle turn signal system, a vehicle heads-up display system, a vehicle digital instrument gauge cluster, a vehicle display device, a vehicle navigation system, a vehicle speaker system, a vehicle door locking or unlocking system, an automatic vehicle door opening or closing system, a vehicle window opening or closing system, or a vehicle sun-roof or moon-roof opening or closing system.

12. The method of claim 11, wherein autonomously controlling the at least one of the identified one or more household devices, the identified one or more first vehicular components, the identified one or more utility devices, the identified one or more second vehicular components, or the identified one or more emergency response devices to perform the one or more tasks comprises:

controlling, with the computing system, operation of the at least one of the vehicle brake system, the vehicle gear system, the vehicle electronic throttle control system, the vehicle steering system, the vehicle turn signal system, the vehicle heads-up display system, the vehicle digital instrument gauge cluster, the vehicle display device, the vehicle navigation system, the vehicle speaker system, the vehicle door locking or unlocking system, the automatic vehicle door opening or closing system, the vehicle window opening or closing system, or the vehicle sun-roof or moon-roof opening or closing system.

13. The method of claim 11, wherein autonomously controlling the at least one of the identified one or more household devices, the identified one or more first vehicular components, the identified one or more utility devices, the identified one or more second vehicular components, or the identified one or more emergency response devices to perform the one or more tasks comprises:

controlling, with the computing system, the vehicle display device; and causing, with the computing system, the vehicle display device to display information associated with the emergency situation.

14. The method of claim 1, wherein the identified one or more utility devices comprise at least one of one or more electric utility devices, one or more gas utility devices, or one or more water utility devices.

15. The method of claim 14, wherein autonomously controlling the at least one of the identified one or more household devices, the identified one or more first vehicular components, the identified one or more utility devices, the identified one or more second vehicular components, or the identified one or more emergency response devices to perform the one or more tasks comprises:

controlling, with the computing system, at least one of the one or more electric utility devices, the one or more gas utility devices, or the one or more water utility devices to perform at least one of turn on, turn off, reroute flow, or adjust flow amount.

16. The method of claim 1, wherein the identified one or more emergency response devices comprise at least one of a smartphone, a tablet, a laptop, a global positioning system ("GPS") device, or a personal digital assistant.

17. The method of claim 1, wherein autonomously controlling the at least one of the identified one or more household devices, the identified one or more first vehicular components, the identified one or more utility devices, the identified one or more second vehicular components, or the identified one or more emergency response devices to perform the one or more tasks comprises:

sending, with the computing system, at least one of a key or a passcode to the one or more emergency response devices, wherein the at least one of the key or the passcode allows the one or more emergency response devices to control at least one of the identified one or more household devices, the identified one or more first vehicular components, or the identified one or more utility devices.

18. The method of claim 17, further comprising:

receiving, with the computing system, a first location associated with at least one of the identified one or more household devices, the identified one or more first vehicular components, or the identified one or more utility devices;

tracking, with the computing system, a second location associated with at least one of the identified one or more second vehicular components or the identified one or more emergency response devices; and based on a determination that the first location and the second location overlap, autonomously controlling, with the computing system, at least one of the identified one or more household devices, the identified one or more first vehicular components, the identified one or more utility devices, the identified one or more second vehicular components, or the identified one or more emergency response devices to perform one or more additional tasks.

19. A system, comprising:

a computing system located at a Public Safety Answering Point ("PSAP"), comprising:

a first transceiver;

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive at least one first message indicative of an emergency situation occurring at a customer premises via the first transceiver;

analyze the at least one first message to determine one or more first actions to be taken in response to the emergency situation;

identify at least one of one or more household devices associated with the customer premises, one or more first vehicular components associated with a vehicle known to be associated with a resident of the customer premises, one or more utility devices associated with a utility service provider supplying at least one of electrical power, gas, or water to the customer premises, one or more second vehicular components associated with each of one or more emergency response vehicles, or one or more emergency response devices associated with one or more emergency responders for performing the determined one or more first actions to be taken, based at least in part on the analysis of the at least one first message; and autonomously control at least one of the identified one or more household devices, the identified one or more first vehicular components, the identified one or more utility devices, the identified one or more second vehicular components, or the identified one or more emergency response devices to perform one or more tasks, based at least in part on the determined one or more first actions to be taken; and the at least one of the identified one or more household devices, the identified one or more first vehicular components, the identified one or more utility devices, the identified one or more second vehicular components, or the identified one or more emergency response devices, each comprising:

a second transceiver;

at least one second processor; and a second non-transitory computer readable medium communicatively coupled to the at least one second processor, the second non-transitory computer readable medium having stored thereon computer software comprising a second set of instructions that, when executed by the at least one second processor, causes at least one of the identified one or more household devices, the identified one or more first vehicular components, the identified one or more utility devices, the identified one or more second vehicular components, or the identified one or more emergency response devices to:

receive control instructions from the computing system; and perform the one or more tasks based on the received control instructions.

20. An apparatus, comprising:

one or more first processors; and a non-transitory computer readable medium communicatively coupled with the one or more first processors, the non-transitory computer readable medium having stored thereon computer software comprising a set of instructions that, when executed by the one or more first processors, causes the apparatus to:

receive at least one first message indicative of an emergency situation occurring at a customer premises;

analyze the at least one first message to determine one or more first actions to be taken in response to the emergency situation;

identify at least one of one or more household devices associated with the customer premises, one or more first vehicular components associated with a vehicle known to be associated with a resident of the customer premises, one or more utility devices associated with a utility service provider supplying at least one of electrical power, gas, or water to the customer premises, one or more second vehicular components associated with each of one or more emergency response vehicles, one or more emergency response devices associated with one or more emergency responders for performing the determined one or more first actions to be taken, based at least in part on the analysis of the at least one first message; and autonomously control at least one of the identified one or more household devices, the identified one or more first vehicular components, the identified one or more utility devices, the identified one or more second vehicular components, or the identified one or more emergency response devices to perform one or more tasks, based at least in part on the determined one or more first actions to be taken, wherein the apparatus may be located at a public safety answering point ("PSAP").

* * * * *